US010558916B2

(12) United States Patent
Hanlon

(10) Patent No.: US 10,558,916 B2
(45) Date of Patent: Feb. 11, 2020

(54) SIMULATION SYSTEM AND METHOD FOR INTEGRATING CLIENT BEHAVIORAL PREFERENCES WITHIN DECISION-BASED SIMULATION SCENARIOS

(71) Applicant: RPH Financial Services, Inc., Stroudsburg, PA (US)

(72) Inventor: Robert Paul Hanlon, Stroudsburg, PA (US)

(73) Assignee: RPH FINANCIAL SERVICES, INC., Stroudsburg, PA (US)

( * ) Notice: Subject to any disclaimer, the term of this patent is extended or adjusted under 35 U.S.C. 154(b) by 278 days.

(21) Appl. No.: 14/916,698

(22) PCT Filed: Jun. 19, 2015

(86) PCT No.: PCT/US2015/036778
§ 371 (c)(1),
(2) Date: Mar. 4, 2016

(87) PCT Pub. No.: WO2015/200140
PCT Pub. Date: Dec. 30, 2015

(65) Prior Publication Data
US 2016/0203402 A1    Jul. 14, 2016

Related U.S. Application Data

(60) Provisional application No. 62/017,219, filed on Jun. 25, 2014.

(51) Int. Cl.
*G06N 5/02* (2006.01)
*G06Q 10/06* (2012.01)
*G06Q 40/08* (2012.01)

(52) U.S. Cl.
CPC .............. *G06N 5/02* (2013.01); *G06Q 10/067* (2013.01); *G06Q 40/08* (2013.01)

(58) Field of Classification Search
CPC ......... G06N 5/02; G06Q 10/067; G06Q 40/08
See application file for complete search history.

(56) References Cited

U.S. PATENT DOCUMENTS

| 6,859,788 B1* | 2/2005 | Davey .................... G06Q 40/06 |
| | | 705/36 R |
| 6,904,408 B1* | 6/2005 | McCarthy ............ A61B 5/6815 |
| | | 705/2 |

(Continued)

OTHER PUBLICATIONS

Maszczyk, T., & Duch, W. (Jun. 2010). Triangular visualization. In International Conference on Artificial Intelligence and Soft Computing (pp. 445-452). Springer, Berlin, Heidelberg. (Year: 2010).*

(Continued)

*Primary Examiner* — Alexey Shmatov
*Assistant Examiner* — Oluwatosin O Alabi
(74) *Attorney, Agent, or Firm* — Luccarelli & Musacchio LLP; Peter A. Luccarelli, Jr.

(57) ABSTRACT

Client decision-making behavioral preferences for evaluating or coping with unknown outcomes (risk temperament or "RT") and absorbing information (preference typology or "PT") during decision-making events are identified and classified by processing client responses to questions. Behavioral preferences are classified and stored in a behavior-influenced decision-making data set (BDDS). The simulator also receives an objective decision-making data set (ODDS) of factually objective inputs. The simulator combines and triangulates the PT and RT information contained in the BDSS with the ODDS and derives a new data set of resultant output goals (OGDS). The transformed OGDS output is displayed as a triangulation of the simulator's RT, PT, and ODDS, with a balanced OGDS displayed as a bubble or spirit level. Out of balance status identifies deviation from intended outcome. OGDS decision-making tools (Continued)

can be recursively combined as modular blocks to create decision-making tools for other desired outcomes.

20 Claims, 16 Drawing Sheets

(56) References Cited

U.S. PATENT DOCUMENTS

| | | | |
|---|---|---|---|
| 7,381,494 B2 | 6/2008 | Fong et al. | |
| 7,801,787 B2* | 9/2010 | Jain | G06Q 40/06 705/35 |
| 7,950,664 B2* | 5/2011 | Chan | G09B 19/00 273/161 |
| 8,417,614 B1* | 4/2013 | Mackrell | G06Q 40/06 705/36 R |
| 8,423,444 B1* | 4/2013 | Mackrell | G06Q 40/06 705/36 R |
| 8,498,928 B2* | 7/2013 | Padgette | G06Q 10/04 705/38 |
| 8,635,132 B1* | 1/2014 | Wilks | G06Q 40/06 705/35 |
| 8,688,575 B2* | 4/2014 | Steiner | G06Q 40/06 705/35 |
| 8,805,759 B1 | 8/2014 | Cha et al. | |
| 8,812,379 B2* | 8/2014 | Torre | G06Q 40/06 705/30 |
| 8,862,454 B2* | 10/2014 | Braman | G06F 17/5009 703/22 |
| 8,903,739 B1* | 12/2014 | Janiczek | G06Q 40/00 705/325 |
| 8,996,646 B2* | 3/2015 | Alstrup | H04L 67/104 709/217 |
| 2002/0138383 A1* | 9/2002 | Rhee | G06Q 10/04 705/36 R |
| 2005/0019734 A1* | 1/2005 | Peled | A61B 5/165 434/236 |
| 2005/0154662 A1* | 7/2005 | Langenwalter | G06Q 40/00 705/35 |
| 2006/0089861 A1 | 4/2006 | King et al. | |
| 2008/0040250 A1* | 2/2008 | Salter | G06Q 40/06 705/36 R |
| 2010/0082367 A1* | 4/2010 | Hains | G06F 19/3456 705/2 |
| 2010/0318427 A1* | 12/2010 | Miranda | G06Q 30/02 705/14.66 |
| 2011/0251978 A1* | 10/2011 | Davies | G06Q 40/00 705/36 R |
| 2012/0179489 A1* | 7/2012 | Gupta | G06F 19/328 705/3 |
| 2013/0310422 A1* | 11/2013 | Brown | A61K 31/13 514/317 |
| 2014/0081768 A1* | 3/2014 | Hocking, Jr. | G06Q 30/0282 705/14.66 |
| 2016/0098519 A1* | 4/2016 | Zwir | G06F 19/24 702/19 |
| 2016/0203402 A1* | 7/2016 | Hanlon | G06N 5/02 706/46 |

OTHER PUBLICATIONS

International Search Report and Written Opinion of the International Searching Authority for International Application No. PCT/US15/36778, dated Sep. 16, 2015, 15 pages.

Loewenstein, George, Hot-Cold Empathy Gaps and Medical Decision Making, Health Psychology, 2005, vol. 24. No. 4 (Suppl.), S49-S56, Copyright 2005 by the American Psychological Association.

* cited by examiner ically they can be clustered or grouped into finite sets of behavioral preference classifications. Human resource professionals and industrial psychologists administer RT and/or PT psychological profile tests to prospective and present employees, which include open-ended questions or statements. The question and statement responses are compiled and classified to provide abstract information that is indicative of the respondent's ways to resolve uncertainty and process information during decision-making exercises. In theory, the

SIMULATION SYSTEM AND METHOD FOR INTEGRATING CLIENT BEHAVIORAL PREFERENCES WITHIN DECISION-BASED SIMULATION SCENARIOS

PRIORITY CLAIM

This application claims the benefit of priority of U.S. Provisional Application No. 62/017,219, filed Jun. 25, 2014, and entitled "INTERACTIVE SIMULATION TOOL AND METHOD FOR SIMULATING INTEGRATED INDIVIDUALIZED LIFE PLANNING OF INVESTOR ASSET, FINANCIAL AND LIFE GOALS", which is incorporated by reference herein.

TECHNICAL FIELD

The invention relates to electronic simulators and simulation data processing methods, for evaluating potential solutions to achieve client planning goal outcomes. Simulator inputs include the client's behavioral preferences that influence her or his decision-making deliberations and factually objective decision-making criteria. The simulator identifies and classifies client's decision-making behavioral preferences by processing client responses to sets of questions, including psychologically validated open-ended questions, and generates a reusable, modular client behavior-influenced decision-making data set (BDDS), which classifies the client's individual behavioral preferences for evaluating or coping with unknown outcomes (risk temperament or "RT") and absorbing information (preference typology or "PT") during decision-making events. The BDDS is stored for subsequent use in present or future client treatment planning by the same or other facilitators. The simulator receives an objective decision-making data set (ODDS) of factually objective decision-making inputs. The simulator combines the psychological and behavioral preference criteria information in the BDSS with the factually objective information in the ODDS and derives a new transformed data set of resultant output goals (OGDS). In some embodiments the transformed OGDS output is displayed as a triangulation of the simulator's RT, PT and ODDS. OGDS facilitates preparation of future actions and tasks that are tailored to achieve the client's desired outcome. In some embodiments, a balanced OGDS is displayed as a triangulated bubble or spirit level between the RT, PT, and ODDS. Displacement of the bubble indicator out of the center alerts the client that actual conditions are deviating from the desired outcome, so that corrective action can be evaluated and implemented.

OGDS files can be recursively combined as modular blocks in multiple sequential levels to create decision-making tools for other desired outcomes. Multiple levels and combinations of modular output goals data sets (OGDS) can be aggregated to create new combined output goals (COGs). OGDS and COG data files can be combined on multiple levels as new triangulated data points to create higher-level COGs through use of the unified simulator platform. By transferring any one or more of the modular PT, RT, BDDS, OG, triangulated OGDS, and triangulated COG data sets to other simulator platforms, other facilitators can perform new decision-making simulations for the same client. The modular data structure also allows the client to recombine the data sets, as desired, in order to generate his or her own new simulations. The simulator platform and remote dashboard COG spirit bubble display facilitates real-time simulation outcome status and display to a client. In this way, a client can initiate a query, or merely access a status update app on a smart device to determine whether one or more planning goals are on track and "balanced", or whether there are deviations that require investigation and correction.

BACKGROUND

Clients, in their individual capacity or as managers of a business organization, retain professional facilitators to obtain treatment services for present or future events or transactions. Typically such facilitators are licensed and regulated professionals in financial services, healthcare, legal, academic, athletic competition, engineering or scientific fields. Other treatment services procured by clients include by way of non-limiting example procurement of complex technical and/or capital-intensive goods or services, such as building construction, information processing technology or life-critical systems or services.

In the past, facilitators and their clients have devised treatment plans using quantifiable, objective metrics in their decision-making process, in order to achieve defined goal-based strategic plans. Illustrative treatment plans are protocols for treatment of serious medical conditions, legal matters, tax planning, financial planning advisory services, athletic training, home or business construction projects and business consulting. While objective milestones and completion results of a treatment plan can be analyzed and quantified rationally, an individual client may not be emotionally satisfied by a treatment experience, because the emotional factors were not included in the treatment plan decision-making process. For example, a patient may feel comfortable with a first physician's demeanor in communicating a medical diagnosis and treatment options to him or her, but dissatisfied with a second physician's communication demeanor of identical objective medical information. In the second scenario it would have been beneficial for the second physician to know, before the patient consultation, how that particular patient prefers to receive and evaluate unknown outcome information, in order to meet the patient's emotional as well as physical wellbeing needs.

Social scientists recognize that human decision-making is influenced by behavioral and psychological preferences that are unique to each individual. The individual person's unique preference, attitude, or mood influence how that person perceives and processes information about events with uncertain future outcomes and how that person absorbs information. Preference, mood, or attitude for processing uncertainty is hereafter referred to as "risk temperament" ("RT"), but that should not be confused with common use of the term in the financial services field. Objective risk temperament in the financial services field generally refers to factual consequences of investment decisions and more particularly to impact of portfolio valuation volatility on achieving financial goal metrics. Preferences, moods, or attitudes for absorption of information are generally recognized in the psychological and social sciences fields as "preference typology" or "PT". While individual human beings have unique RT and PT profiles, statistically they can be clustered or grouped into finite sets of behavioral preference classifications. Human resource professionals and industrial psychologists administer RT and/or PT psychological profile tests to prospective and present employees, which include open-ended questions or statements. The question and statement responses are compiled and classified to provide abstract information that is indicative of the respondent's ways to resolve uncertainty and process information during decision-making exercises. In theory, the testing business organization optimizes each individual employee's job performance by tailoring employee interactions with others and the work environment in ways that are compatible with the employee's behavioral strengths. For example, some employees prefer to concentrate on objective facts when formulating decisions. Other employees prefer to include intuitive, emotional, values, and/or subjective factors in their decision-making tasks.

In reality, there may not be an efficient or practical way to communicate RT/PT information about individual role-players to every person involved in a decision-making transaction. Returning to the prior example of the patient and physicians, given efficiency pressures and narrower specialization in the medical field, there is no presently practical way, other than word of mouth briefing from prior attending healthcare professionals who personally know the patent, for a physician to access information about the patient's individual RT/PT profile, so that the treatment decision interactions can be tailored to enhance the patient's emotional and physical wellness. Individual healthcare professional facilitators do not have sufficient treatment time to gather RT/PT profile information about each individual patient during initial patient consultations. Conversely, patients would soon tire of responding to a series of RT/PT profile questions each time they meet a new attending physician.

In another industry decision-making treatment scenario, an investment client might be served by more than one financial specialist. It would be helpful for all specialists to be able to have access to objectively quantifiable and reliable client RT/PT profile information, so that financial goal planning and interaction during decision-making sessions can be tailored in ways that are compatible with the client's ability to cope with uncertainties in financial markets and how the person best absorbs information. While two different financial clients may have identical financial backgrounds, investment timelines wealth accumulation goals and risk exposure to market volatility, the first client's psychological ability to cope with uncertainty (RT) might be relatively less than the second client's corresponding ability Thus, the first client might become dissatisfied with the investment advisor facilitator's services in a declining market return scenario if uncertainty anxieties were not discussed during prior financial planning decision-making sessions. The second client's preference typology (PT) may require greater active interaction with his or her facilitator investment advisor. Then, during the more active interaction, they can discuss "what if" scenarios during decision-making exercise. In contrast, the first client prefers to review and absorb detailed written analyst reports before starting the discussions. Each of the two clients requires distinctly different information communication methodologies and timing, even though both will ultimately receive the same objective information. When the financial advisor commences financial planning or portfolio review discussions, the first client might feel pressured by the advisor into making premature decisions without adequate preparation unless the advisor previously furnished detailed background analytical information. The second client might feel neglected if the advisor does not communicate the same analytical information within an interactive discussions setting.

Despite decision-making process enhancements and advantages offered by inclusion of individual abilities to absorb and process information about unknown outcomes, clients may be reluctant to divulge or release such personal information with facilitators absent their explicit consent to use and control such information. As any given person has many decision-making transactions with facilitators, repetitive inquiry and testing to determine RT/PT profile information would be unduly burdensome and expensive for consumers and facilitators.

SUMMARY

A simulator identifies and classifies a client's decision-making behavioral preferences, moods, or attitudes for coping with unknown outcomes by and absorbing information, by processing client responses to sets of questions, including psychologically validated open-ended questions. The simulator generates a reusable, modular client behavior-influenced decision-making data set (BDDS), which classifies the client's individual behavioral preferences for evaluating unknown outcomes and absorbing information during decision-making events. The BDDS is stored for subsequent use in present or future client treatment planning. The simulator also receives an objective decision-making data set (ODDS) of factually objective decision-making inputs. The simulator combines the psychological and behavioral preference criteria information in the BDSS with the factually objective information in the ODDS and derives a new transformed data set of resultant output goals (OGDS). The simulator's OGDS facilitates preparation of future actions and tasks that are tailored to achieve the client's desired outcome. In some embodiments the transformed OGDS output is displayed as a triangulation of the simulator's RT, PT and ODDS. In some embodiments, a balanced OGDS is displayed as a triangulated bubble or spirit level between the RT, PT, and ODDS. Displacement of the bubble indicator out of the center alerts the client that actual conditions are deviating from the desired outcome, so that corrective action can be evaluated and implemented. OGDS decision-making tools can be combined recursively as modular blocks, in order to create new decision-making tools for other desired outcomes. Visual displays are enhanced, through application of interactive video game and game design techniques ("gamification"), to engage and motivate clients to devise and monitor their goals. The gamification interactive display concepts tap into basic desires and needs of the user-client emotional impulses for achievement and status recognition.

Individuals demonstrate different preferences, moods, or attitudes for coping with unknown outcomes, which is hereafter generally referred to as risk temperament ("RT"). Individual preference, mood, or attitude for information processing is hereafter generally referred to as preference typology (PT). The disclosed simulator identifies RT/PT preferences by analyzing client responses to questions posed by a facilitator or any other third party authorized by the client. The simulation tool uses the question responses to generate a RT/PT client decision-making data set (BDDS), which classifies the client's individual behavioral preferences for evaluating unknown outcomes and absorbing information during decision-making events. The BDDS is stored for subsequent use in present or future client treatment planning by the same or other facilitators. Once the BDDS is stored, the client can control and authorize its use for subsequent decision-making treatment plans with the same or other facilitators, or revisit results of prior decisions and actions in a feedback loop, without the need to repeat the BDDS compilation process.

The same or a different simulator subsequently integrates the BDDS client behavioral data classifications with quantified, rationally objective decision-making tasks, issues and/or goals for a desired treatment outcome (likely proposed by a facilitator in the decision-making subject field)

that are contained in the ODDS, so that the facilitator and client jointly can discuss and decide treatment options for reaching the desired outcome. In some embodiments, the simulator derived decision-making factors and ultimate treatment plan are archived for separate or joint display and/or analysis by the facilitator or client.

In one exemplary simulator visual display that is disclosed herein, PT, RT, and OD processing results (i.e., the classification information in the BDDS and ODDS data files) are displayed as three separate, primary classification, rotating wheels, or donuts. Each classification in a respective primary classification wheel appears as a different shade of a single color. The output decision-making goals OGDS classification is displayed as an aggregate or resultant wheel intermediate and circumscribed by the three PT/RT/objective primary classification wheels, which is displayed in a color blend of each of the three wheels. In a further exemplary simulator visual display, the aggregate or resultant wheel appears as a donut with a spirit level-like bubble or other symbol in its center, to symbolize triangulated balancing among the three PT/RT/objective primary classification factors. Imbalance of any one or more classifications relative to the remaining classifications displaces the sprit bubble or other symbol out of the aggregate donut center, providing a convenient, easy to comprehend status "dashboard" for a viewer that the desired output goal is out of balance.

In yet other another exemplary simulator visual display, multiple aggregate classifications for related client factors can be combined or cascaded in sequential layers of separate PT/RT/objective primary classification trios. Each of the trios derived in the same general timespan share common PT/RT classifications (which can accessed by reference to the common, accessible BDDS, or provided separately as separate PT and RT classification files) that are subsequently combined with a companion ODDS. Thus when combining multiple aggregate classifications for related client factors, the simulator can quickly determine each aggregate classification by combining the existing BDDS with each corresponding ODDS. Thus, two of the three weighting factors (PT/RT classifications) remain constant weighting factors for subsequent OGDS calculations. As previously noted, multiple OGDS files can be triangulated with each other to derive a combined outcome goal (COG) data file. In some embodiments, COG and OGDS data files are combined to perform new aggregate simulations, and are nested or cascaded sequentially or in hierarchal fashion into higher levels of COGs. Thus, a change in a lower or parallel level OGDS or COG can be transferred to other simulations in the same related simulation chain.

Exemplary embodiments of the invention feature an electronic simulator tool for generating a reusable behavior-influenced decision-making data set (BDDS) module defining behavioral risk temperament and preference typology characteristics of an individual client, where the electronic simulator tool includes a controller platform utilizing an operating system and microinstruction code for generating, storing and accessing the reusable BDDS module and a communication bus for effectuating communication between a plurality of separate devices. The plurality of separate devices may include, but is not limited to, a first memory element for storing a predetermined set of risk temperament (RT) classifications and a predetermined set of preference typology (PT) classifications, a second memory element for storing a predetermined set of questions used in evaluating the individual client, a client input interface for providing a communication path between an individual client's communication device and the controller platform, and a processor responsive to microinstruction code for: (1) receiving responses to the predetermined set of questions from the individual client via the client input interface; (2) processing the responses to generate an RT value and a PT value for the individual client; (3) comparing the RT value to the predetermined set of RT classifications to select a proper RT classification for the individual client; (4) comparing the PT value to the predetermined set of PT classifications to select a proper PT classification for the individual client; and (5) defining the proper RT and PT classifications as a generated BDDS profile for the individual client, where a third memory element is used for storing the generated BDDS profile as the reusable BDDS module for the individual client. The first, second, and third memory elements may be configured as separate memory devices, separate partitions in one memory device, or any other suitable arrangement. The platform also includes a facilitator output interface to the third memory element for allowing third party access to the reusable BDDS module, for use in performing client treatment planning.

Other exemplary embodiments of the invention feature an electronic simulator visual display system for generating visualization output results of a reusable behavior-influenced decision-making data set (BDDS) module of behavioral risk temperament and preference typology characteristics that are associated with an individual client. In one case, the electronic simulator visual display system is formed to comprise a controller platform utilizing an operating system and microinstruction code for generating, storing and accessing the reusable BDDS module, with the controller platform including a communication bus for effectuating communication between a plurality of separate devices. The plurality of separate devices including, but not limited to, a first memory element for storing a predetermined set of risk temperament (RT) classifications and a predetermined set of preference typology (PT) classifications, a second memory element for storing a predetermined set of questions used in evaluating the individual client, a client input interface for providing a communication path between an individual client's communication device and the controller platform, and a processor responsive to microinstruction code for: (1) receiving responses to the predetermined set of questions from the individual client via the client input interface; (2) processing the responses to generate an RT value and a PT value for the individual client; (3) comparing the RT value to the predetermined set of RT classifications to select a proper RT classification for the individual client; (4) comparing the PT value to the predetermined set of PT classifications to select a proper PT classification for the individual client; and (5) defining the proper RT and PT classifications as a generated BDDS profile for the individual client that is stored in a third memory element for storing the generated BDDS profile as the reusable BDDS module for the individual client. The plurality of devices also includes a facilitator output interface to the third memory element for allowing third party access to the reusable BDDS module, for use in performing goal-specific third party objectives. The visual display system itself further includes a human machine interface (HMI) for accessing the third memory element and the reusable BDDS module, where the HMI operable to generate image-based data associated with the reusable BDDS module, and a display device in communication with the HMI and responsive to the image-based data for providing a visual realization of the proper RT and PT classifications stored in the reusable BDDS module. Preferably, the visual realization takes the form of separate visual sectors; a first visual sector illustrating the predetermined set of RT classifications with the proper RT classification presented in a visually-distinct manner with respect to the remaining set of RT classifications, and a second visual sector illustrating the predetermined set of PT classifications with the proper PT classification presented in a visually-distinct manner with respect to the remaining set of PT classifications.

Additional exemplary embodiments of the invention feature a process for creating a reusable behavior-influenced decision-making data set (BDDS) module of behavior-related risk temperament and preference typology characteristics of an individual client. The process takes the form of accessing a collection of data structures in computer readable memory (including a first memory element storing a predetermined set of risk temperament (RT) classifications and a predetermined set of preference typology (PT) classifications, a second memory element storing a predetermined set of questions used in evaluating the individual client, and a third memory element for storing the BDDS profile as the reusable BDDS module for the individual client) and using a processor responsive to instructions stored as non-transitory program code for: (1) receiving responses to the predetermined set of questions from the individual client via a client input interface; (2) processing the responses to generate an RT value and a PT value for the individual client; (3) comparing the RT value to the predetermined set of RT classifications to select a proper RT classification for the individual client; (4) comparing the PT value to the predetermined set of PT classifications to select a proper PT classification for the individual client; (5) defining the proper RT and PT classifications as a generated BDDS profile for the individual client; and (6) storing the generated BDDS profile as the reusable BDDS module for the individual client in the third memory element.

Yet another exemplary embodiment of the invention features a process for creating a set of resultant output goals from a combination of reusable behavior-influenced decision-making data set (BDDS) module of behavior-related risk temperament and preference typology characteristics of an individual client and a factually objective data set associated with at least one specific goal of an individual client, the process following the steps of: accessing a collection of data structures in computer readable memory (including a first memory element for storing a predetermined set of risk temperament (RT) classifications and a predetermined set of preference typology (PT) classifications, a second memory element for storing a predetermined set of questions used in evaluating the individual client, and a third memory element for storing the BDDS profile as the reusable BDDS module for the individual client); collecting a factually objective data set from the individual client; and using a processor responsive to instructions stored as non-transitory program code for (1) receiving responses to the predetermined set of questions from the individual client via a client input interface; (2) processing the responses to generate an RT value and a PT value for the individual client; (3) comparing the RT value to the predetermined set of RT classifications to select a proper RT classification for the individual client; (4) comparing the PT value to the predetermined set of PT classifications to select a proper PT classification for the individual client; (4) defining the proper RT and PT classifications as a generated BDDS profile for the individual client; (5) storing the proper RT and PT classifications in the third memory element as the generated reusable BDDS module for the individual client; and (6) weighting the collected factual objective data set by the proper RT and PT classifications to generate a output goal data set (OGDS) for use by the individual client. In some embodiments the factually objective data set collected from the individual client is associated with a plurality of separate individual goals and the collecting step of the process collects a plurality of different sets of objective data. In performing the weighting step of the process the following steps are performed: (1) each separate factually objective data set is weighed with the proper RT and PT classifications; and (2) a separate output goal data set is generated for each individual goal. In other embodiments, a group of three different output goal data sets are created for the individual client, with the results of the group triangulated and combined to an create integrated client planning tool based upon a combination of the plurality of individual goals. In additional embodiments, groups of three different output goal data sets are created in a hierarchical form, wherein any modifications to the RT and PT classifications at any level of the hierarchical form are applied to the other levels in a recursive manner until a new balanced condition is achieved.

The respective features of the exemplary embodiments of the invention that are described herein may be applied jointly or severally in any combination or sub-combination.

BRIEF DESCRIPTION OF DRAWINGS

The exemplary embodiments of the invention are further described in the following detailed description in conjunction with the accompanying drawings, in which.

To facilitate understanding, identical reference numerals have been used, where possible, to designate identical elements that are common to the figures.

DESCRIPTION OF EMBODIMENTS

Figure 1:
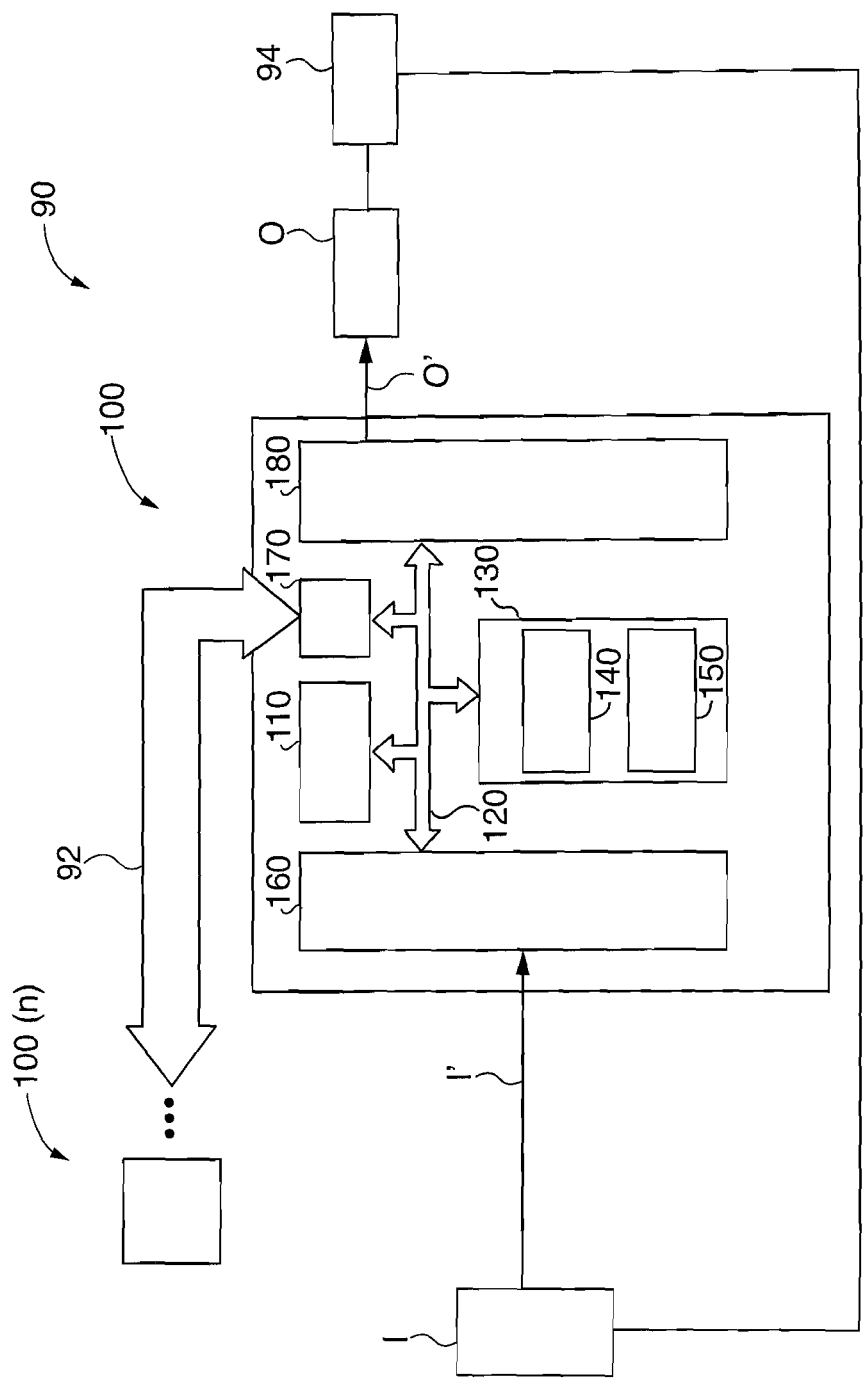
FIG. 1 is a block diagram of an exemplary embodiment of the decision-making simulation system of the invention.

Exemplary embodiments of the invention are directed to electronic simulators and simulation data processing methods, for evaluating potential solutions to achieve client planning goal outcomes. Various applications of the simulator and its simulation data processing methods are described herein, including specific exemplary embodiments directed to the financial advisory services field. Simulator inputs include the client's behavioral preferences, moods, or attitudes that influence decision-making deliberations and factually objective decision-making criteria. The simulator processes client responses to sets of questions (including psychologically validated open-ended questions), and generates a behavior-influenced decision-making data set (BDDS), which classifies the client's individual behavioral preferences for evaluating or coping with unknown outcomes and absorbing information during decision-making events. The simulator receives an objective decision-making data set (ODDS) of factually objective decision-making inputs. The simulator combines the psychological and behavioral preference criteria information in the BDDS with the factually objective information in the ODDS and with the three input factors derives a new data set of resultant output goals (OGDS). The simulator's OGDS facilitates preparation of future actions and tasks that are tailored to achieve the client's desired outcome.

Modular data structures used in the simulator facilitate reuse of the ODDS, BDDS, and OGDS for other decision-making treatments or transactions. For example, the client can control access to and distribute his or her BDDS module to multiple facilitators, for use in new simulations. Similarly, facilitators can create modular ODDS data files for specific applications and reuse those files for multiple clients. OGDS outcomes can be combined in scenarios where there are overlapping or complimentary decision-making goals that are relevant to a common outcome. For example, an investment advisor facilitator and investment client can use the simulator disclosed herein to combine otherwise intuitively disparate outcomes of ODGS data files relating to financial goal based planning (ultimate financial goals), asset allocation planning (how to invest classes of assets), and life fulfillment or aspirational planning (life objectives) as intermediate decision-making tools for periodically evaluating integrated individualized life planning (i.e., are the investment strategies securing sufficient financial resources needed to accomplish the client's lifestyle priorities). Thus, OGDS decision-making tools can be combined recursively as modular blocks, in order to create new decision-making tools for other desired outcome simulations.

Risk Temperament (RT) and Preference Typology (PT) Classification

Objective holistic goals (OD) are weighted more heavily than a client's risk temperament (RT) or preference typology (PT). Only after a client's holistic life stage is affirmed, can their risk temperament be factored. A client's preference typology (preference, mood, or attitude for absorbing information) is utilized continuously in servicing and educating the client as to his or her potential options and decision-making process, as well as in reviews with the client (review visual layout, information delivery, quantitative and qualitative focus shifts depending on a client's preference typology). Risk Temperament (RT) categorizes a person's preference, mood, or attitude towards or coping with the unknown, or towards uncertainty, while the person does not know the probability of the outcome, and his or her personal reaction to them. Risk Temperament has been the subject of Dr. David Keirsey's academic studies. One of Dr. Keirsey's publications on this subject is *Please Understand Me II: Temperament Character Intelligence*, Promethus Nemesis Book Company (1998). RT develops and evolves as a person is exposed to life situations and events; accumulates experiential knowledge of personal reaction and coping mechanisms and correlation with ultimate outcomes resulting from those situations and events. As people get older, they become wiser or more tolerant of that unknown, but some become more rigid and not as pliable and malleable as when they were younger. Hence, re-evaluation of RT is recommended after major life-changing events or achievement of life major milestones; e.g., marriage or divorce, arrival of children, career change, retirement, and special-needs family member planning. While risk temperament changes over time because of one's life experiences, it remains relatively constant in the shorter time spans of a few years. An RT evaluation remains relevant over a several-year period, absent occurrence of a major event, and thus is re-useable and relevant for subsequent BDDS input into new goal evaluation decision-making simulations for a multi-year period, without the need for the client to submit to new RT testing.

RT is determined during a client interview that is conducted face-to-face, or online. The client is asked to respond to a series of Socratic questions (i.e. psychologically validated open-ended questions) that the facilitator chooses from a question database. The question database may contain sub-groups or clusters of questions that are tailored for specific service applications. For example, RT questions posed by a healthcare practitioner/facilitator may focus on how the patient coped with past medical uncertainties. RT questions posed by an investment advisor/facilitator may focus on the client's past investment uncertainties. Merchants and other than licensed professionals may wish to focus on client past purchasing and order fulfillment uncertainties. Exemplary open-ended questions for identifying and categorizing client RT are in Appendix I. Question psychology validation methods are described in detail below.

In embodiments disclosed herein, Risk Temperament is presently classified in the following four categories, with the understanding that categorization descriptions and number of categories is subject to future evolution:

Rational—Rationals are the most tolerant towards risk and uncertainty. Rationals rely on the facts and are skeptical only of solutions that do not make sense to them. In the context of investment simulations, Rationals have little bias towards where the money is invested as long as the facts support the decision and are comfortable with tactical and dynamic investing.

Artisan—Artisans are the least sensitive towards the magnitude of risk. In the context of investment simulations, Artisans prefer to learn by doing and want to experience how investments work. Artisans like to be involved and are intrigued by the concept of tactical investing. Artisans do not want to miss an opportunity that may be out there.

Idealist—Most idealists will take on risk only if they believe the projected outcome will reward them well for that risk. In the context of investment simulations, Idealists trust that risk is a necessary part of investing but seek to make sure it fits with their internal values system. Idealists are most comfortable with strategic asset allocation and a long-term plan; in some circumstances will feel compelled towards tactical investing.

Guardian—Guardians are cautious and take on risk only if they believe they are well rewarded for that risk. In the context of investment simulations, Guardians trust authority and believe in working hard and following the rules to gain their wealth through strategic asset allocation. Guardians often times will have a "home bias" for where their money is invested as well as a bias towards guaranteed dividend/income paying investments.

Individual Preference Typology (PT) is constant over time and can be determined once without the need for the client to submit to new PT testing. Exemplary multiple-choice questions for identifying and categorizing client PT are in Appendix II. Question psychology validation methods are described in detail below.

In embodiments disclosed herein, Preference Typology is presently classified in the following four categories, which are derivatives of academic research of Dr. Isabel Briggs Meyers. Dr. Meyers' publications on the subject include *Introduction to Type*, Consulting Psychologist Press Inc., (1993), and *Gifts Differing: Understanding Personality Type*, Davies-Black Publishing (1995). The specific PT classification embodiments disclosed herein, their categorization descriptions, and number of categories is subject to future evolution. Present PT classifications are:

Perceiver—Perceivers prefer a flexible channel of communication that includes a back and forth of information exchanging as opposed to a structured discussion based solely on facts. Perceivers are curious by nature and prefer learning using a continued flow of information. In the context of investment simulations, the perceiver feels most comfortable when their facilitator/advisor/consultant shares with them a continuous flow of new information in the form of articles, emails, and teleconferences. Perceivers have the tendency to change their minds when new information becomes available and rely on their facilitator/advisor/consultant to help them stick to their long-term plan while still feeling comfortable to discuss openly any new ideas.

Feeler—Feelers prefer to learn and make decisions based on a values oriented process and not on an analytical basis. The feelings of others are taken into high consideration when a feeler concludes. In the context of investment simulations, feelers are most comfortable during a discussion that explains the actual companies they are invested with in terms of that company's particular product and mission statement. This best helps the feeler understand the company's true value system it is involved in the community. This information creates an organized structure based primarily on values, which is how feelers are comfortable making decisions.

Thinker—Thinkers prefer a discussion that is analytical in nature with numbers and effective reasoning. Information communicated to a thinker should be based on logical facts, articles, books, and other research on empirical data. Thinkers are motivated mostly by a desire to achieve their goals and process information best when it is given in a logical, quantitative, fact based system. Thinkers are most impressed by competence and end results.

Judger—Judgers prefer a structured and organized discussion of facts. Judgers are most comfortable in an active setting where they can ask questions, gather the facts, and then reach their own conclusions based on these facts. Judgers tend to process information based on a system of pros and cons and "what-if" scenarios. In the context of investment simulations, Judgers are planners by nature and like to make sure there is a solid plan in place that can be followed to achieve their goals.

Client RT, PT, and Objective Question Proposed Validation Methods

In proposed exemplary embodiments of the invention, question validity is established ex ante, ex post, via iterative methods, and is based both experimental and observational bases in each of the three dimensions of focus: preference, mood, and attitude toward and coping with risk (RT), preference, mood, and attitude toward behavioral processing of information (PT), and the objective and holistic goals and outcomes that are to be achieved as a result of the decision-making process. Under this proposed process, the various dimensions of its validity are also established statistically at standard levels of significance. Proposed exemplary question test methods for application in the financial services field are described herein.

Each question to be validated is tested using experimental methods, among others, with human subjects being queried on a series of demographic characteristics (age, sex, etc.), and then being shown via the methodology and format described above a series of options for which they are asked to declare their preferences, which are recorded and which form the foundations of validity, among others. Each option has characteristics derived from its respective domain. For instance, within the question set component related to preference, mood, and attitude toward/coping with risk (RT), subjects are show a series of gambles with variable (risky or uncertain) outcomes as well as riskless outcomes, having been granted a hypothetical and alternatively a real cash endowment or, in additional testing, prizes based on task completion (e.g., with the gambles relating to loss of the prize). Within the preference typology (PT) domain, for example, subjects are queried along their dimensions of personality as outlined above, and so on. Within each of the three domains, each specific question is tested for Face Validity, Content Validity, Construct Validity and, reliability.

Face Validity ("does is make sense when I consider it") is measured using pre- and post-experiment interviews in which human subjects are asked to share their feedback on the assessment items and on whether the items were legitimately reflective of the intended domain construct. Face validity or logical validity of the invention is specifically based on human subject responses and their experiential feedback.

Content Validity ("does subject matter experts agree") is assessed by providing examples of the question at various stages of development to subject matter experts (SME's) and receiving and aggregating feedback. In addition, SME's are asked to experience the experimental protocol in person, providing feedback. Content validity is also tested by comparison of a nested subset of the scales embedded within the assessment technology with those that have been used in practice by facilitators in the subject matter field historically. For example, in a medical facilitation context, past responses to types of questions posed by physicians to patients are compared with the proposed new questions. In a financial services facilitation context, responses to questions posed by professional investment advisors are used for evaluation of the proposed new questions. An operational list is developed, representing commonly accepted criteria necessary for the new proposed question to assess human personality RT and PT, as well as known traditional notions of risk aversion, with both static and dynamic components.

Construct Validity ("does it measure what it's supposed to measure") is tested based on known concepts of human subject query, convergent and divergent validity. The following examples of each concept are described in the context of a financial services question evaluation process:

Pre- and post-question experiment queries about the human subject's behavior, financial/life-position, and self-perception as they relate to potential experimental outcomes are compared to the three present invention domain-related RT, PT and OG experimental responses.

Convergent validity is assessed by comparing the question domains, where appropriate, to results from existing, known evaluation instruments/methodologies. For example, known public-domain financial services "risk tolerance questionnaires" are completed by several sub-samples of the experimental human test population. In addition, various elements of popular personality typology scales and their measures, including proclivity for risk taking or gambling, are included in the experimental assessment. These elements are rotated to have under-the-null concordance with the sub-axes contained in each domain and tested for correlation, using known social science evaluation methodologies. The tested questions "nest" the results of these common scales, thus representing a projection from the more highly dimensioned and resolution space spanned by the new questions and methods of the present invention onto the lower dimensional space of traditional assessments. Put simply, we are testing the assessment's ability to assess whether actual actions of groups along the scales of the present invention (along the dimensions of the axes within each of the three main classification groups, namely low risk to high risk tolerance, along dimensions of personality RT and PT, etc.) are those associated with the criteria. For example, one can test, via surveys, whether those individuals associated with greater tolerance for risk, as implied by greater levels of equity allocation in their investment portfolios, are those who are categorized as such in the present invention simulations. In addition, one relates the present invention's ability to distinguish those with high measured emotional intelligence or emotional quotient (EQ) via a standard assessment versus low measured EQ using the same assessment.

Divergent validity is assessed in two dimensions. First, the orthogonality of the domain elements (e.g., RT and PT) is established generally across items and scales. Second, in cases in which there is residual and unwanted correlation, items are edited, excluded, or included or the items are orthogonalized. This nomological approach results in finer, more powerful elements of assessment. An ANOVA approach is utilized along with varimax rotation of principal components. Such statistical analysis calculations can be performed with commercially available social science statistical analysis software packages, such as SPSS Statistics, which is marketed by International Business Machines Corporation (IBM).

Reliability of the objective, RT, and PT questions is assessed by checking the factor structures of the domain measurements across subjects and iterations, to verify that the test question responses are correlated with demographics and theory. This correlation step checks whether the Cronbach Alphas and related parameters with p-values lower than 5% for groups of questions are observed by estimating each construct within each item cluster. When the estimated constructs do not achieve sufficient correlation, the questions are altered, and the experiments are repeated.

Temporal assessment, distinguishes test question long-term components from short-term components, using known horizon-framing techniques. Within the experimental protocol, the dynamic characteristics of the questions and its elements are validated using horizon framing, in which the element of time is introduced, first to anchor immediacy and finality; and in addition, to assess the components. Additionally, assessed stable and unstable elements, such as response categorization scales and the posed questions, can change or remain stable across time or upon occurrence of world events. For instance, we introduce economic and life "shocks" experimentally, including by way of example a sudden loss of endowment or sudden reclamation of an outcome prize. In addition, we model ongoing time via experiments with several rounds.

Survey assessments are also completed over larger sample sizes from volunteers from financial services firms. The queries forming the basis of tests for invention validity are the same or similar to those used in the test question experimental protocol; the comparison methods are essentially the same. Construct Validity, scale reliability, nesting, time horizon and environmental shock characteristics are found to reinforce the experimental setting.

Within each domain and across each basis frame, principal components analysis are performed, selecting components with eigenvalues above unity or using standard critical values for non-Gaussian or limiting distributions under the Central Limit Theorem, in order to review and reduce the dimensionality of the measures. In addition, mini-versions of the assessment are developed based on those items loading most heavily on the rotated principal components and re-tested for out of sample validity within standard levels of significance (p-values <5% on Cronbach's Alpha, etc.).

Objective Decision (OD) and Objective Goals (OG) Classifications

Objective Decision (OD) classifications are developed for each specific objective decision making simulation and are the inputs for each objective decision-making data set (ODDS). In the simulations herein, the ODDS is combined with the BDDS PT and RT inputs to derive an output goals classification and output goals data set (OGDS). More particularly, in the exemplary financial services Integrated Individualized Life Planning Process (IILP) simulation of Appendix III, three separate objective simulations are performed: Affirmation Asset Allocation, Goal Based Planning, and Life Fulfillment Planning. The three simulation results are inputs for the overall IILP process simulation.

The Affirmation Asset Allocation simulation is directed to identifying investment policies, ultimately manifested in an Investment Policy Statement, that are consistent with the client's behavioral profile that is determined in the RT and PT evaluations. This simulation ascertains client financial capacity, which is correlated with the client's holistic life stage. The Affirmation Asset Allocation simulation drives investment decisions. The investment policies (also referred to as financial holistic goals) comprise the traditional objective financial suitability section of financial consulting (age, wages, expenses, life goals, etc.). Typical input factual questions relate to earnings, marginal tax bracket, number of dependents, occupational stability, etc. Input facts about the client are ascertained in questionnaire format for new clients, while existing clients have shared this information through their ongoing and lasting relationship with the financial consultant facilitator. The factual inputs from the financial questionnaire are classified into the following four the objective inputs for the Affirmation Asset Allocation (AAA) simulation, but their categorization descriptions, and number of categories is subject to future evolution:

Accumulate—These clients are younger, they need to accumulate wealth for meeting their financial goals (future and current).

Secure—This client is within 5 years of their planned retirement "the Red Zone" and 5 years through retirement. This is where return sequence can devastate the longevity of their assets because getting closer to the time when they are going to call upon their assets to replace their income. Therefore, they need to secure their assets.

Enjoy—Through sensitivity-studies done in financial planning software, the client, and advisor have collectively determined that the client has hit critical mass. By testing with different iterations of returns to achieve high probability of success, the client can now enjoy what they have accumulated all of these years.

Transfer—Transferring the wealth to the next generation. This leads to forms of estate planning because now they realize they cannot outlive their money, their money will outlive them. Therefore, they want to take legacy-planning action.

The AAA simulation ultimately generates six objective goals (OG) classifications. There are more OG classifications than OD inputs, in order to create a higher resolution decision-making spectrum. In the financial services context, higher OG output resolution facilitates increased solution flexibility, for example to generate asset allocation options and percentage allocation bandwidths for each such option. Exemplary OG classifications for the AAA simulation are:

Assurer—One who attempts to make certain. One who seeks to feel secure about his capital preservation.

Attender—One who tends to what she has. One whose attention is to care for her capital in an effort to protect purchasing power.

Assessor—One who is willing to examine risk to balance the need for stability yet to achieve incremental capital appreciation.

Acquirer—One who is willing to accept more risk in an effort to achieve greater capital appreciation.

Advancer—One who is willing to raise the amount of risk, therefore to hasten the rate of capital appreciation.

Aggressor—One who is energetically committed to the pursuit of capital opportunity regardless of the necessary risk that may be taken.

If there were four rather than six OG Affirmation classifications, the bandwidth for each asset class becomes wider. This increases the standard deviation of the client's portfolio, meaning a higher volatility to their investment portfolio returns. Each of the clients' objective holistic goal output classifications can be considered to represent a particular bandwidth as well, (i.e., clients in the "Accumulate" stage can either be an Aggressor, Advancer or Acquirer) depending on the results of a multitude of suitability factors as well as the impact of the other elements in the simulation's inclusion of RT and PT factors. The quantity of OG output classifications is determined by the specific decision-making application. Some applications may require more than six classifications, while others require fewer classifications.

This same general four OD input and six OG output classification concept is applied in the Goal Based Planning, and Life Fulfillment Planning simulation modules. OD and OG classifications for each of the other two simulation modules are identified in Appendix III herein.

Simulation System Architecture

FIG. 1 is a schematic block diagram of an exemplary embodiment of the interactive simulation tool system 90 of the invention, including networked communication with one or more controller platforms 100-100(*n*). Each controller platform 100 includes a processor 110 and a controller bus 120 in communication therewith. Processor 110 is coupled to one or more internal or external memory devices 130 that include therein operating system 140 and application program 150 software module instruction sets that are accessed and executed by the processor, and cause its respective controlled device (e.g., simulation information input and visualization output viewing display through human machine interface (HMI) 94) to perform control operations over their respective associated subsystems.

While reference to an exemplary controller platform 100 architecture and implementation by software modules executed by the processor 110, it is also to be understood that the present invention may be implemented in various forms of hardware, software, firmware, special purpose processors, or a combination thereof. Preferably, aspects of the present invention are implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform 100 also includes an operating system and microinstruction code. The various processes and functions described herein may be either part of the microinstruction code or part of the program (or combination thereof) which is executed via the operating system. In addition, various other peripheral devices may be connected to the computer/controller platform 100.

It is to be understood that, because some of the constituent system components and method steps depicted in the accompanying figures are preferably implemented in software, the actual connections between the system components (or the process steps) may differ depending upon the manner in which the present invention is programmed. Specifically, any of the computer platforms or devices may be interconnected using any existing or later-discovered networking technology: all may be connected through a larger network system, such as a corporate network, metropolitan network or a global network, such as the Internet.

Computer/controller platform 100 receives input communications from one or more input devices I via respective communications pathways I' through input interface 160, that in turn can distribute the input information via the controller bus 120. The controller platform 100 also has a communications interface 170 for communication with other controllers on a shared external data bus, such as the data bus 92. Output interface 180 facilitates communication with one or more output devices O via associated communications pathways O'.

The computer/controller platform 100 in the interactive simulation tool 90 is associated with input devices I/associated input communications pathways I' that include the inputted client risk temperament and preference typology questionnaire responses that will be processed by the simulation tool to generate the RT and PT behavioral classifications, which in some embodiments are incorporated into a combined client behavioral decision-making data set (BDDS). Objective, factual information that is the subject of the decision-making exercise is also inputted into the system 90, which in some embodiments is incorporated into a client objective decision-making data set (ODDS). In an exemplary client financial planning application, an ODDS includes information about the client's lifestyle, assets, life planning goals, etc. Output devices O/associated output communications pathways O' that are associated with that computer/controller platform 100 outputs the decision-making outcomes resulting from the simulation tool system 90 processing of the trio of the three RT/PT/OD classifications, which in some embodiments are incorporated into an output or outcome goals data set (OGDS). In an exemplary client financial planning application, outcomes include by way of example the affirmation asset allocation, goal based planning, fulfillment planning, and individualized life-planning outputs, which are described in detail herein and in Appendix III.

Figure 2:
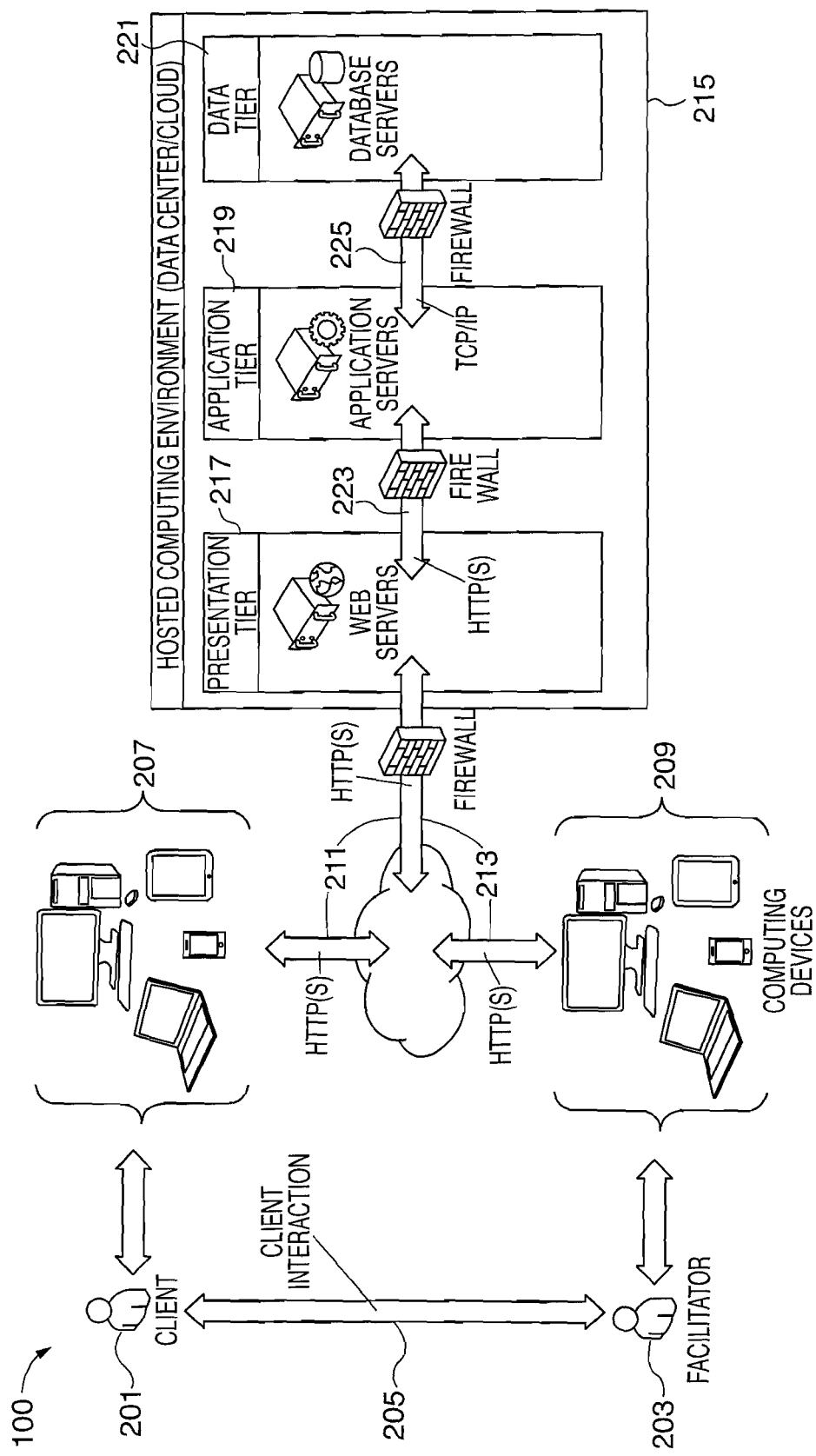
FIG. 2 is a block diagram of another exemplary embodiment of the decision-making simulation system of the invention in a hosted data processing system environment.

FIG. 2 illustrates another embodiment of a process simulation system of the invention, wherein the controller platform 100 is implemented and delivered as a software as a service (SaaS) offering to clients and their facilitators, such as financial firms. More particularly, FIG. 2 shows an exemplary software architecture design of the controller platform in a hosted system 100 as multi-tier application architecture on a hosted computing environment 215. The hosted computing environment 215 physically resides within a traditional data center or alternatively within a virtualized cloud platform. In both cases, the hosted computing environment 215 is implemented in, and comprises, both load balanced and fault tolerant servers.

System 100 is accessed by client 201 and facilitator, such as a financial advisor, physician, athlete trainer or coach, or other advisor 203 through computing devices 207 and 209 respectively, and such client access may be in conjunction with client interaction 205. Computing devices 207 and 209 include, but are not limited to desktop computers, laptop computers, tablet computers, smartphones and smart wrist or other wearable communication devices. The user interface for computing devices 207 and 209 is a web browser, but for devices such as smartphones, wearable wrist or other communication devices and tablets, native applications may be built and distributed through an app store ecosystem such as those presently commercially provided by Amazon, Apple, Google, and Microsoft or equivalent.

The hosted computing environment 215 comprises three tiers in its software architecture design: a presentation tier 217, an application tier 219, and a data tier 221. Software in system 100 is written a using a modern web application framework (WAF) employing the Model-View-Controller (MVC) software architectural pattern. Computer code for business rules and associated algorithms for computing system 100 in these tiers may be written in one or more programming paradigms or languages, spanning different programming paradigms (domain-specific, dynamic, functional, object-oriented, procedural). Examples of such languages include SQL, Transact-SQL, C #, F #, JavaScript and Typescript.

The presentation tier 217 contains public web servers that send static and dynamic web page content such as Hypertext Markup Language (HTML) and JavaScript using a responsive web design (RWD) methodology. In addition, the presentation tier 217 contains public facing Representation State Transfer (REST) web services that send JavaScript Object Notation (BON) to facilitate responsive and dynamic user interface capabilities. All requests and responses are sent to computing devices 207 and 209 through connections 211 and 213 via the Hypertext Transfer Protocol (HTTP) and Hypertext Transfer Protocol Secure (HTTPS) protocols.

The application tier 219 contains application servers that execute business domain logic and rules for system 100 modules. The application tier 219 is accessed from the presentation tier 217 through HTTP or HTTPS connection 223.

The data tier 221 contains database servers with relational database management system (RDBMS) databases and extract, transform and load (ETL) logic to support data feeds pertinent to system 100. The data tier 221 is accessed from the object-relational mapping (ORM) software running in the application tier 219 through TCP/IP connection 225.

To facilitate a clear understanding of the present invention, illustrative examples are provided herein which describe certain aspects of the simulation system architecture. However, it is to be appreciated that these illustrations are not meant to limit the scope of the invention, and are provided herein to illustrate certain concepts associated with the invention.

It is also to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. In addition, various other peripheral devices may be connected to the computer platform such as an additional data storage device and a printing device.

It is to be understood that, because some of the constituent system components and process steps depicted in the accompanying figures are preferably implemented in software, the actual connections between the system components (or the process steps) may differ depending upon the manner in which the present invention is programmed. Specifically, any of the computers or devices may be interconnected using any existing or later-discovered networking technology and may also all be connected through a lager network system, such as a corporate network, metropolitan network or a global network, such as the Internet.

Simulation System Operation

Figure 3:
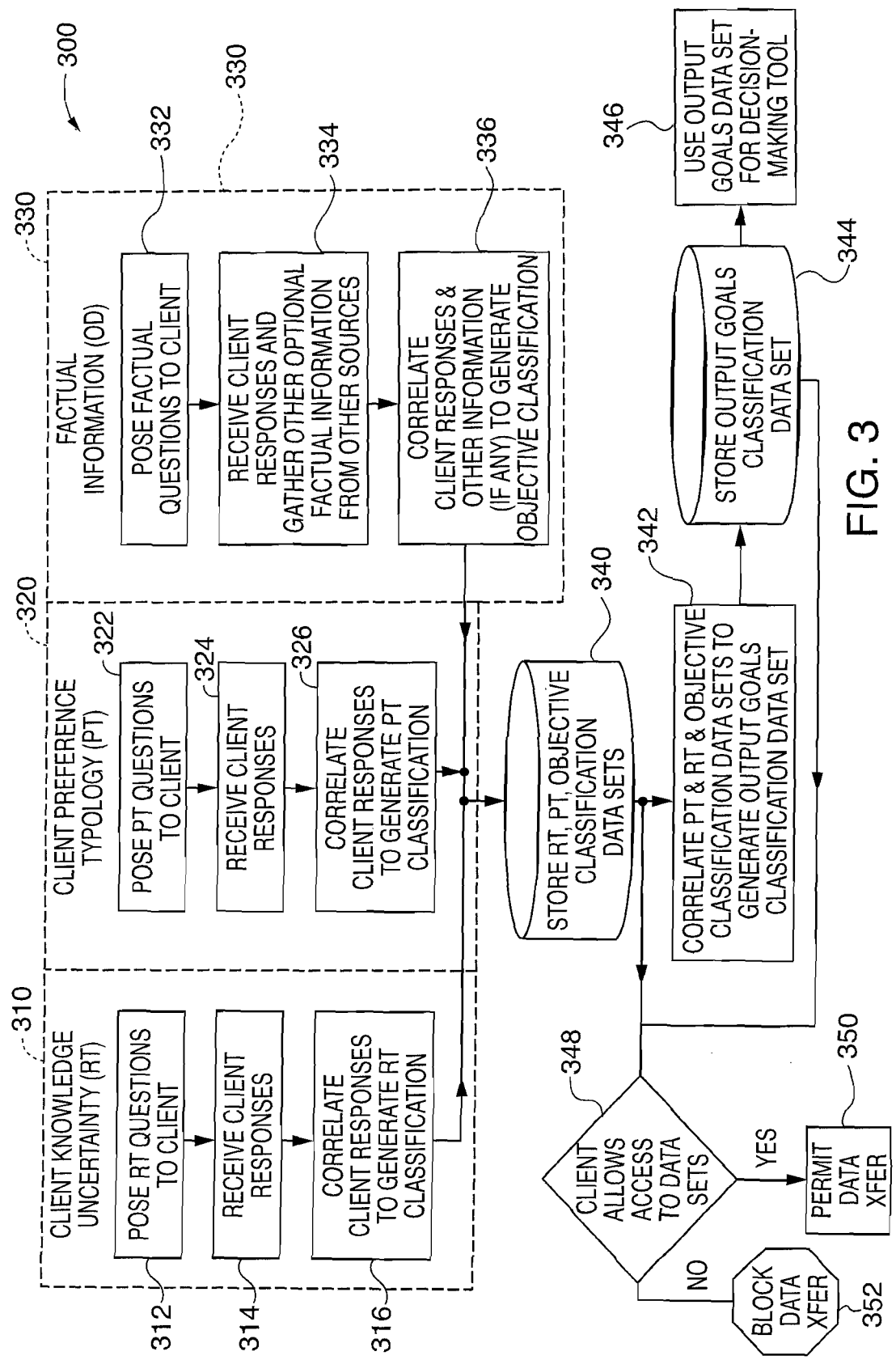
FIG. 3 is a process flow diagram, which illustrates operation of the decision-making simulation system of the invention in an exemplary financial services application embodiment.

FIG. 3, an exemplary embodiment of the simulation system 300 operation in an exemplary investment advisory financial services application with an ultimate goal of generating the Affirmation Asset Allocation, which is described in Appendix III. In order to generate a desired output goals classification data set, the system utilizes separate input streams of client knowledge uncertainty (i.e., risk temperament) (RT) behavioral data 310, client preference typology (PT) behavioral data 320, and factual information objective data (OD) 330. Objective and psychological information gathering is performed by any combination of face-to-face or video conference meetings between client and advisor, paper written submissions or client input to automated questionnaires via web-based tools. Specifically, respective RT-, PT- and OD-related questions are posed to the client (steps 312, 322, 332) during interviews or by written communication. As previously described, client risk temperament is determined by client responses to social science validated open-ended questionnaires, while preference typology is determined by client responses to standard multiple-choice questions. Exemplary risk temperament and preference typology questionnaires are in the respective Appendices I and II). Exemplary OD-related objective information in the IILP financial services application of Appendix III includes client history, background, and suitability (e.g., age, income, children, job, tax bracket, cash, and level of assets).

Respective RT-, PT- and OD-related question responses are received from the client (steps 314, 324, 334), and stored for further processing. Additional OD factual information in step 334 optionally is gathered from third party sources, and stored for further processing.

The simulation tool system 90 evaluates the gathered factual and psychological information, and generates the client's respective risk temperament, preference typology, and objective goals classifications in steps 316, 326 and 336. Holistic goals (OD) are weighted more heavily than a client's risk temperament (RT) or preference typology (PT). Question responses are weighted and classified by use of commercially available social science statistical analysis software, such as SPSS Statistics software, which is marketed by International Business Machines Corporation (IBM). After a client's OD factors are determined, the behavioral factors are then included in the output goals and construction of the OGDS. In accordance with embodiments of the present invention that are described herein, a client's preference typology is utilized continuously during the client/facilitator service relationship, in servicing and educating the client as to their potential options and decision making processes, as well as in reviews with the client, wherein the review visual layout, information delivery, quantitative and qualitative focus shifts depending on a client's PT.

Exemplary financial services weighting factors for classifying RT and PT classifications are described in Appendix III. The RT, PT, and OD objective classifications are stored as data sets within a storage device of the system 90 (step 340). In this described operational process environment 300, the simulation system 90 organizes the respective stored classifications in common designated formats.

Within the storage step 340 of the FIG. 3 embodiment, the objective classification of step 336, and any desired related backup information, are formatted in modular objective decision-making data set (ODDS). The RT and PT classifications of steps 316 and 326, and any desired related backup information, are formatted in respective modular behavioral decision-making data sets. In this exemplary embodiment, the PT and RT classifications and any desired backup data are combined in a common behavioral decision-making data set (BDDS). The combined BDDS is advantageous because the PT behavioral attributes of a person remain relatively constant within a lifetime. The RT attributes of a person evolve over a lifetime based on changing circumstances, accumulated life experiences and wisdom, but can generally be treated as constant within a several-year timespan. Therefore, once a BDDS is created by the simulator system 90, that data set is stored in step 340 and can be reused within a multi-year span to perform many different decision-making simulations. It is to be understood that the objective decision-making data set (ODDS) changes with different decision-making scenario simulations, but in each scenario, the same BDDS is employed, allowing this important client-specific information to become part of the decision-making process.

In step 342, the simulation tool combines and evaluates the previously generated separate RT, PT and objective classifications of steps 316, 326 and 336, in order to generate an overall classification data set of output goals (OGDS). The OGDS is stored in step 344. The output goals of step 342 are used by clients and their facilitator (e.g., investment advisors) as a decision-making tool when evaluating various ways to execute a plan for achieving the treatment goal (step 346). In a financial services simulation process, exemplary investment advisory application goals for providing an Integrated Individualized Life Planning (IILP) treatment plan are described in Appendix III and shown in FIGS. 4-16. When performing the IILP simulation, an investment advisor facilitator and investment client can use the simulator disclosed herein to combine otherwise intuitively disparate outcomes of ODGS data files relating to financial goal based planning (ultimate financial goals), asset allocation planning (how to invest classes of assets), and life aspirational planning (life objectives) as intermediate decision-making tools for periodically evaluating integrated individualized life planning (i.e., are the investment strategies securing sufficient financial resources needed to accomplish the client's lifestyle priorities). The IILP simulation is reevaluated periodically to monitor performance and update the treatment process in response to changes in goals and/or events. In the IILP simulation, the BDDS RT and PT classifications of steps 316 and 326 are utilized as weighting factors along with the relevant object factual information OD to generate outcomes for one or more of the client's (i) financial goal based planning, (ii) asset allocations to reach those goals, or (iii) aspirational goals in step 342.

A client may wish to grant third parties access to the BDDS, ODDS, OGDS or any related stored information, such as that stored in steps 340 and 344, so that new planning simulations can be performed or for review of past simulation archived information. In accordance with embodiments of the present invention that are described herein, the client can grant information access to any of the aforementioned data sets to third parties in step 348. The client arranges for data transfer in step 350 or blocks data transfer in step 352. Advantageously the client can allow or block access to the data in one or more communications to the BDDS and/or ODDS data custodian or operator of the simulator system 90. Such communications to the data custodian are sent via smart phone, smart tablet, Web portal, mobile device application, facsimile or e-mail, hardcopy letter or memorandum, in-person oral or telephone communication to the simulator system 90 data custodian or operator.

Advantageously in some embodiments the data custodian and simulation system operator performing the simulation process 300 of FIG. 3 is a professional treatment decision-making facilitator, such as a financial advisor, attorney, physician or other licensed medical provider. In other embodiments, the facilitator is software as a service (SaaS) provider engaged by a client to perform one or more of the PT, RT, and objective factual classifications. Advantageously a client can have a first facilitator perform the PT and RT behavioral classifications and store the classification results in a BDDS under client-controlled access restrictions. Whenever the client seeks assistance of a facilitator in the first or subsequent goals simulation decision-making scenarios, he, (or she) can release the previously stored BDDS for use in completing the next decision-making scenario. It is envisioned that a client could engage a financial services facilitator to perform a complete trio simulation of PT, RT and factual information for an investment planning or portfolio review. A BDDS generated during the financial services simulation subsequently can be transferred to a physician or hospital for use in the same client's patient intake and medical-treatment plan simulation scenario. During patient assessment and intake, the objective medical condition and assessment information is combined with the existing BDDS information in the simulator 90, to provide output goals for patient treatment during doctor/patient treatment consultations.

In a commercial business context, a customer/client can authorize transfer of BDDS information to a vendor/facilitator, which combined with objective information about the commercial transaction in a simulator 90 simulation process 300, formulates a sales/treatment decision-making plan. In commercial or other contexts, it is contemplated that portions of subsets of the simulation 300 steps are readily parsed to different specialist resource providers in the transaction process. A first facilitator resource provider might be tasked with determining the client RT 310 and PT 320 behavioral classifications, while a second facilitator resource provider may specialize in assisting vendors and other facilitators in a consulting capacity to help formulate factual information gathering and classification in step 330. A third facilitator may gather the information and classifications provided by the first and second facilitator/resource providers to complete the overall output goal classification of step 342 and use the output goals data set as part of the decision-making tool, advising the client of decision-making options in step 346. Multiple output goals data sets are combinable as inputs for composite combined output goals (COG) simulations, such as in the exemplary financial services embodiment of Appendix III.

Simulation System Exemplary Visual Display

Visual displays are enhanced, through application of interactive video game and game design techniques ("gamification"), to engage and motivate clients to devise and monitor their goals. The gamification interactive display concepts tap into basic desires and needs of the user-client emotional impulses for achievement and status recognition. The interactive displays, unified simulator technology communications platform, and modular data set structures encourage the user client to monitor goal achievement status in real time with minimal effort, such as by periodically accessing a smart device application dashboard. In embodiments of the present invention the user-client, in a quick and intuitively easy to comprehend visual display, can determine whether one or more individual goals or combined goals (COGs) are "in balance". An out-of-balance display alerts the user-client or an authorized advisor/facilitator that one or more factors influencing the outcome require investigation or remediation. For example, a real-time event, such as financial market indicator or client health physical condition, can be monitored, with simulation OGDS or COG data output status modified in response to changes in the monitored event(s).

FIGS. 4-16 show exemplary progression of visual image embodiments 400, 401-408, 410, 412, 414 and 416 that are displayed on a visual monitor by the simulation system 90 in performing a nested and iterative exemplary financial services client asset allocation simulation (see, e.g., Appendix III, which includes definitions of OD, RT, PT, resultant output goals transformed data set OGDS and ultimate combined outcome goal COG). In the Appendix III Integrated Individualized Life Planning Process (IILP) simulation, visual displays of FIGS. 13-16, results of a client's three separate Affirmation Asset Allocation (FIGS. 4-6), Goal Based Planning (FIGS. 7-9), and Life Fulfillment Planning (FIGS. 10-12) simulations are combined as triangulated weighting factors in a simulation dashboard that displays a composite snapshot of whether overall financial decisions are on path to meet the client's overall life goals, which are for this simulation the combined output goals, COG of FIG. 16. The display of any of the above figures, or truncated versions thereof, appears on remote monitors, personal computers, tablet devices, smart phones, wrist or other wearable communication devices that are accessible by the client or facilitators who service the client.

The initial description of the overall simulation display described herein focuses on the Affirmation Asset Allocation simulation of FIGS. 4-7. Similar display formats are utilized for the Goal Based Planning, and Life Fulfillment Planning simulations. It is to be understood that the labeled reference numbers and lead lines are inserted in the drawings for correlation with the written description, and do not appear on that actual visual display. Various described portions of the visual display are advantageously displayed in different colors, to enhance viewer comprehension and information retention. However, patent application and issued patent drawings are generally by convention or rule published in black and white only. Therefore, exemplary display portion assigned colors will be described verbally in the written description herein. Where exemplary portions of a display are intended to be varying shades of the same color, they are shown in different density cross-hatching.

Figure 4:
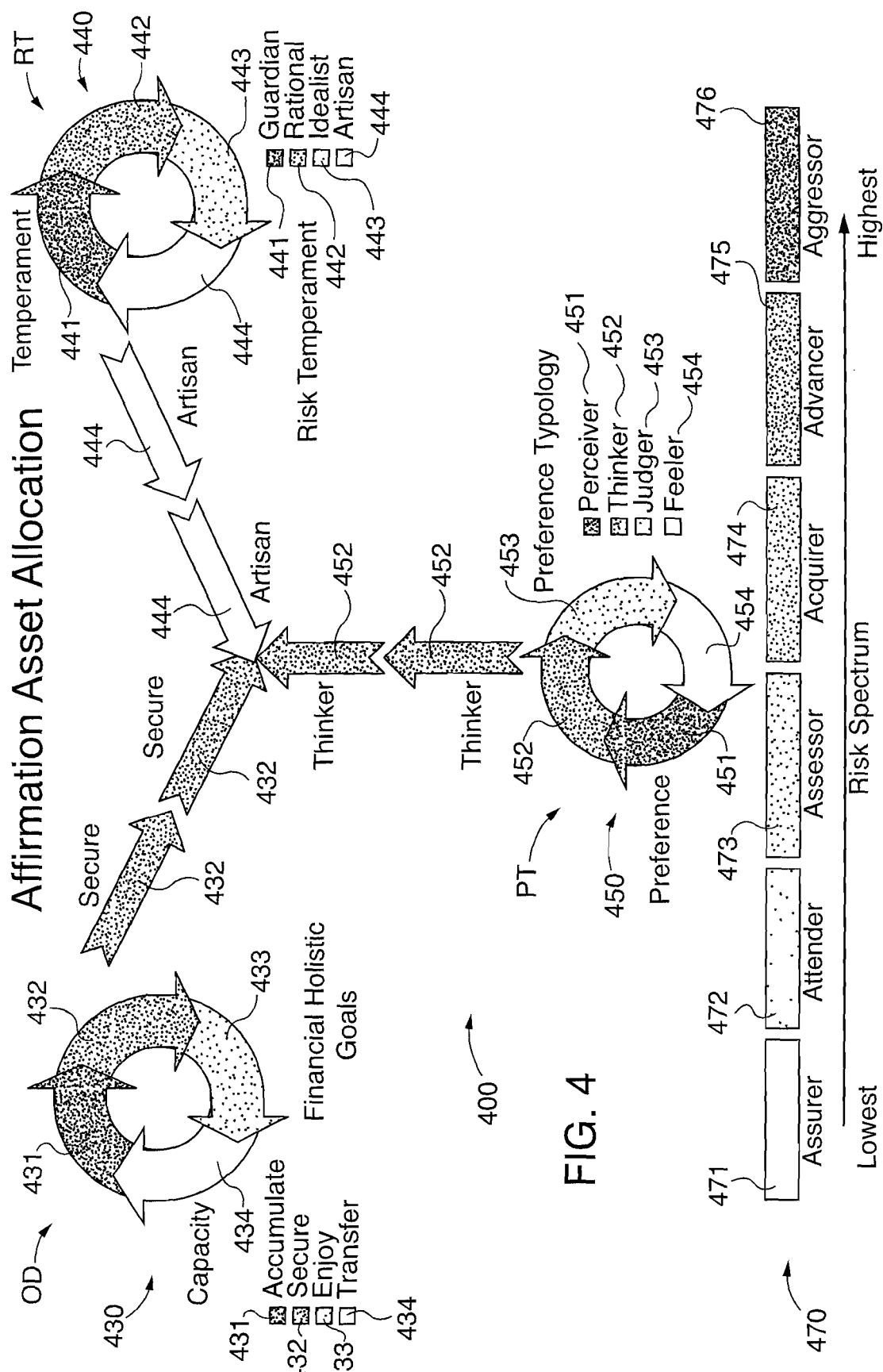
FIGS. 4-16 are visual output display embodiments generated by the simulation system of the invention.
Figure 5:
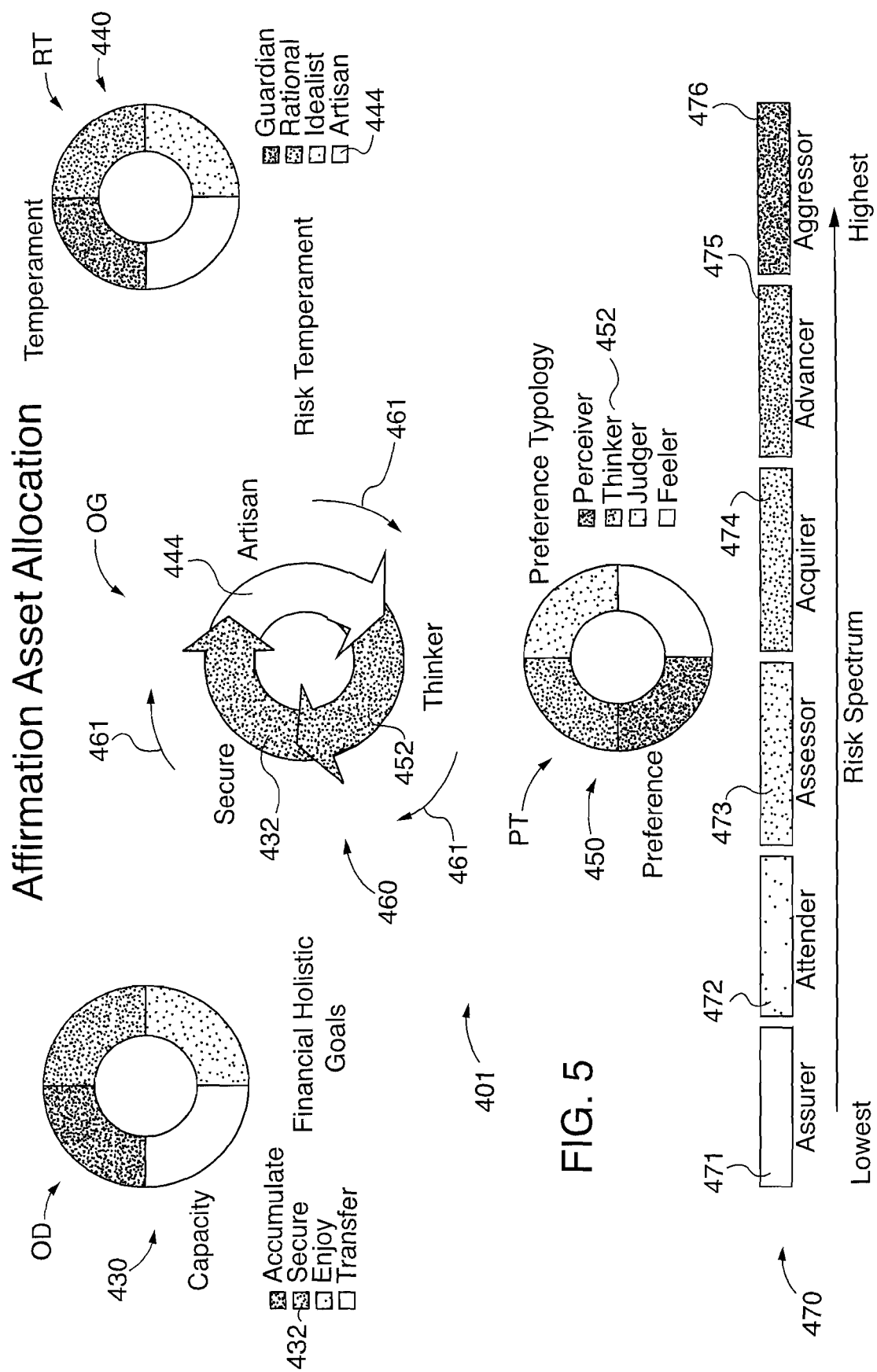
Figure 6:
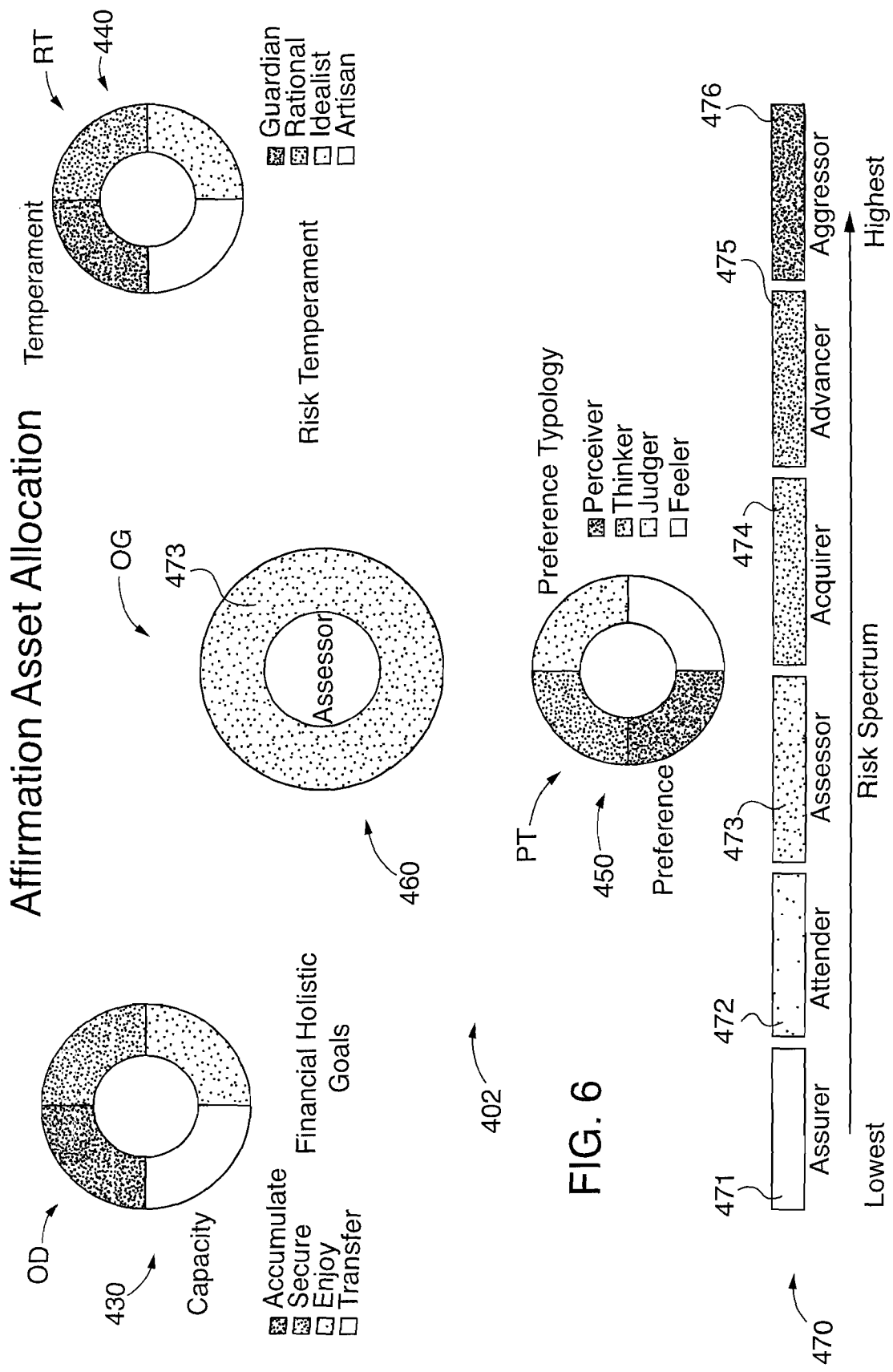
Figure 7:
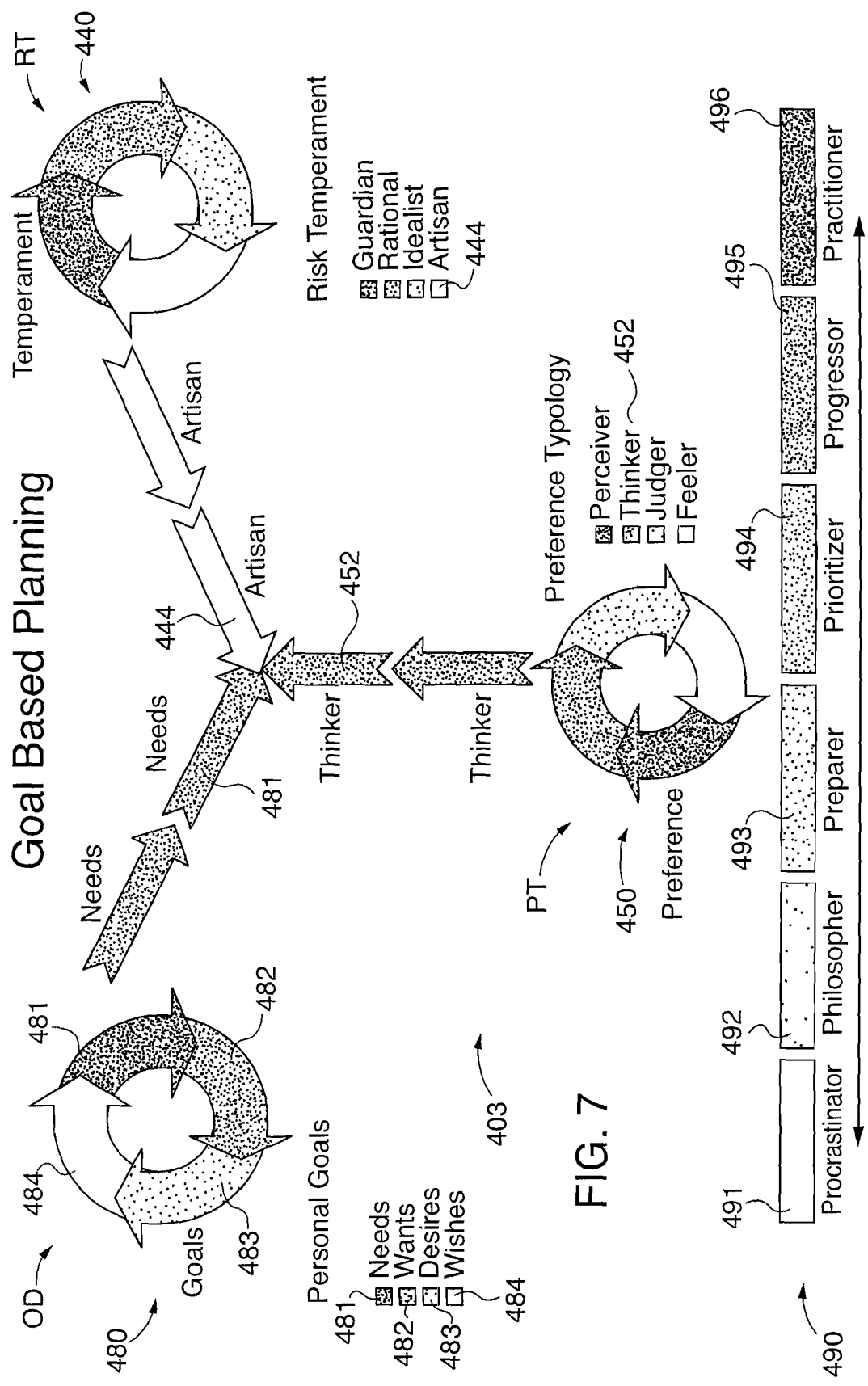
Figure 8:
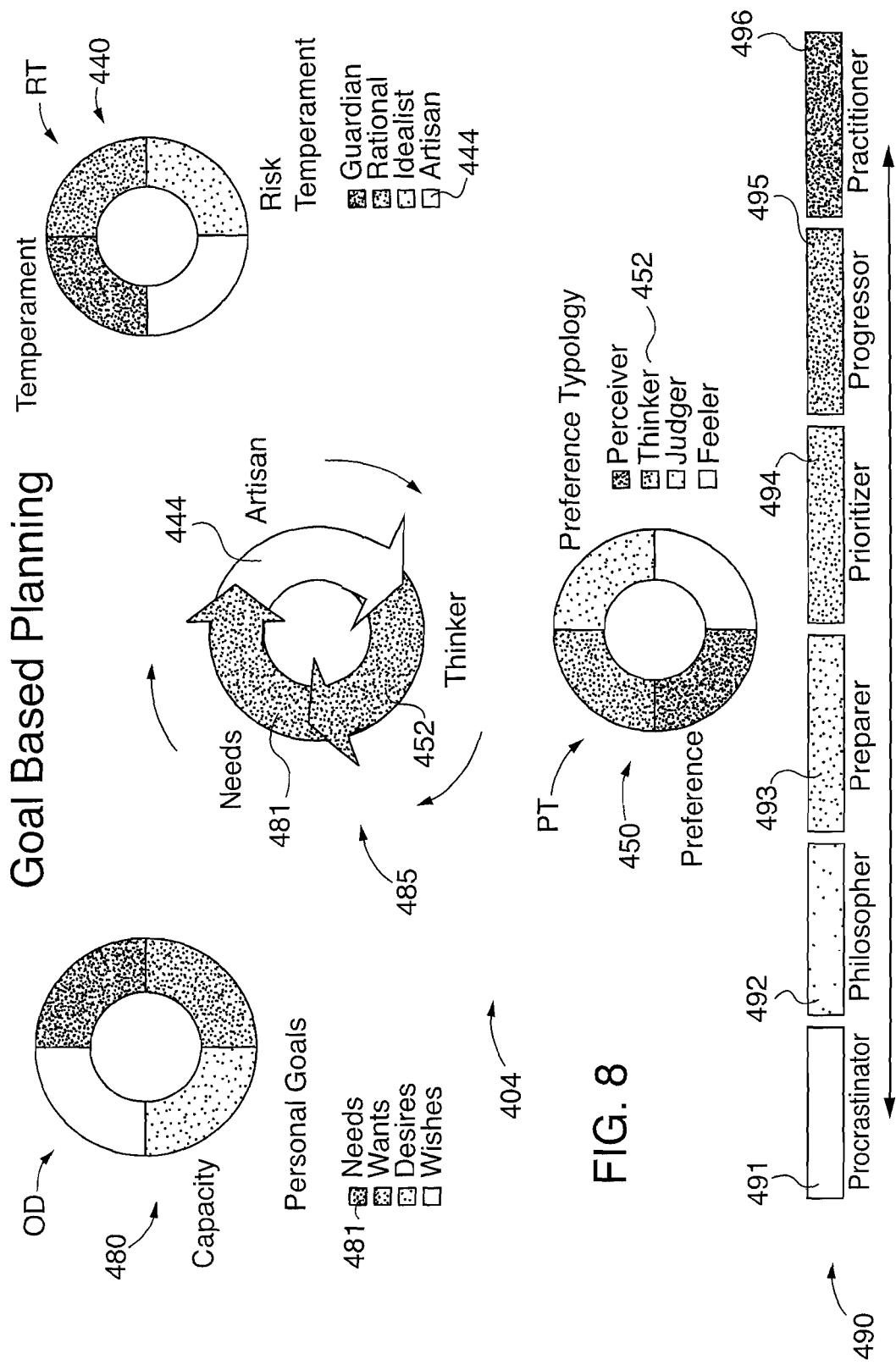

Referring to the Affirmation Asset Allocation simulation displays of FIGS. 4-6, the actual/objective data classification of the FIG. 3 simulation process step 336 is displayed on a sectored wheel or annular "donut" 430, which is labeled as "OD" to the viewer, in a first color (illustrative example: blue color), with each of four objective classifications occupying separate sectors of the annulus 431-434 (in four different blue shades). The knowledge uncertainty (risk temperament) classification of the FIG. 3 simulation process step 316 is displayed on a sectored wheel or annular "donut" 440, which is labeled as "RT" to the viewer, in a second color (illustrative example: yellow color), with the four RT classifications 441-444 (in four different yellow shades) occupying separate sectors of the annulus. The preference typology classification of the FIG. 3 process step 326 is displayed on a sectored wheel or annular "donut" 450, which is labeled as "PT" to the viewer, in a third color (illustrative example: gray color), with the four PT classifications 541-544 occupying separate sectors of the annulus. FIGS. 4-6 are illustrative of sequential animated visual images, wherein the RT/PT/OD donuts 440, 450 and 430 in the displayed trio spin clockwise in FIG. 4, each stopping to display its respective classification category as corresponding color moving arrows pointing to the triangulated center between the three donuts. In FIG. 5, the moving arrows have faded away, displaying a central OG donut 460. The central OG donut 460 spins, showing respective colored arrows in motion corresponding to the OD, RT, and PT exemplary classifications; respectively "Secure" 432, "Artisan" 444, and "Thinker" 452.

In FIG. 6 the OG sectored wheel or donut 460, former moving colored arrows transition into a homogeneous green shade blend of the prior blue, yellow, and gray colors from the formerly-spinning OG donut of FIG. 5, corresponding to the green family of colors of the OG 470 display bar classifications 471-476. Further, in FIG. 6, a green colored viewer-visual label "Assessor", for the OG classification 473, is oriented in the center of OG green donut, showing graphically that the completed simulation outcome has led to a balancing among the respective visual OD, RT, and PT classifications. Any non-proportional weighting contribution among the three-subset classifications shifts the label (here shown as "Assessor") out of the OG donut center, analogous to a carpenter's spirit bubble leveling tool. Other colors and shapes can be substituted for the blue, yellow, gray, and green annular donut shapes. Other animation sequences or static sequences can be substituted for the spinning wheels or donuts.

Displays similar to the Affirmation Asset Allocation of FIGS. 4-6 simulations are utilized for the Goal Based Planning and Life fulfillment Planning simulations of FIGS. 7-12. In both of those additional simulations, the Risk Temperament 440 display, including the RT classifications 441-444 and the Preference Typology 450 display, including the PT classifications 451-454 are duplicated from the Affirmation Asset Allocation displays of FIGS. 3-5. The RT and PT display outputs, respectively, are the simulation results from the knowledge uncertainty classification of simulation process step 316, and the preference typology classification, process step 326, illustrated in FIG. 3. In the Goal Based Planning visual simulation, the OD wheel or donut 480 displays the personal goals classifications 481-484. Here the OD classification "Needs" 481 is displayed in the OD moving arrows of FIG. 7 and the spinning OG wheel 485 of FIG. 8. A resultant OG wheel 486 in a blue blended color of the purple (OG), yellow (RT) and gray (PT) shades displays the OG "Prioritizer" classification 494 in FIG. 9. The OG display bar 490 shows all of the six classifications 491-496, in illustrative example purple color shades. In the Life Fulfillment Planning visual simulation, the OD wheel or donut 500 displays the purposed based goals classifications 501-504. Here the OD classification "Personal" 501 is displayed in the OD moving arrows of FIG. 10 and the spinning OG wheel 505 of FIG. 11. A resultant OG wheel 506 in a blended color of the red (OG), yellow (RT) and gray (PT) shades displays the OG "Collaborator" classification 514 in FIG. 12. The OG display bar 510 shows all of the six classifications 511-516.

Figure 13:
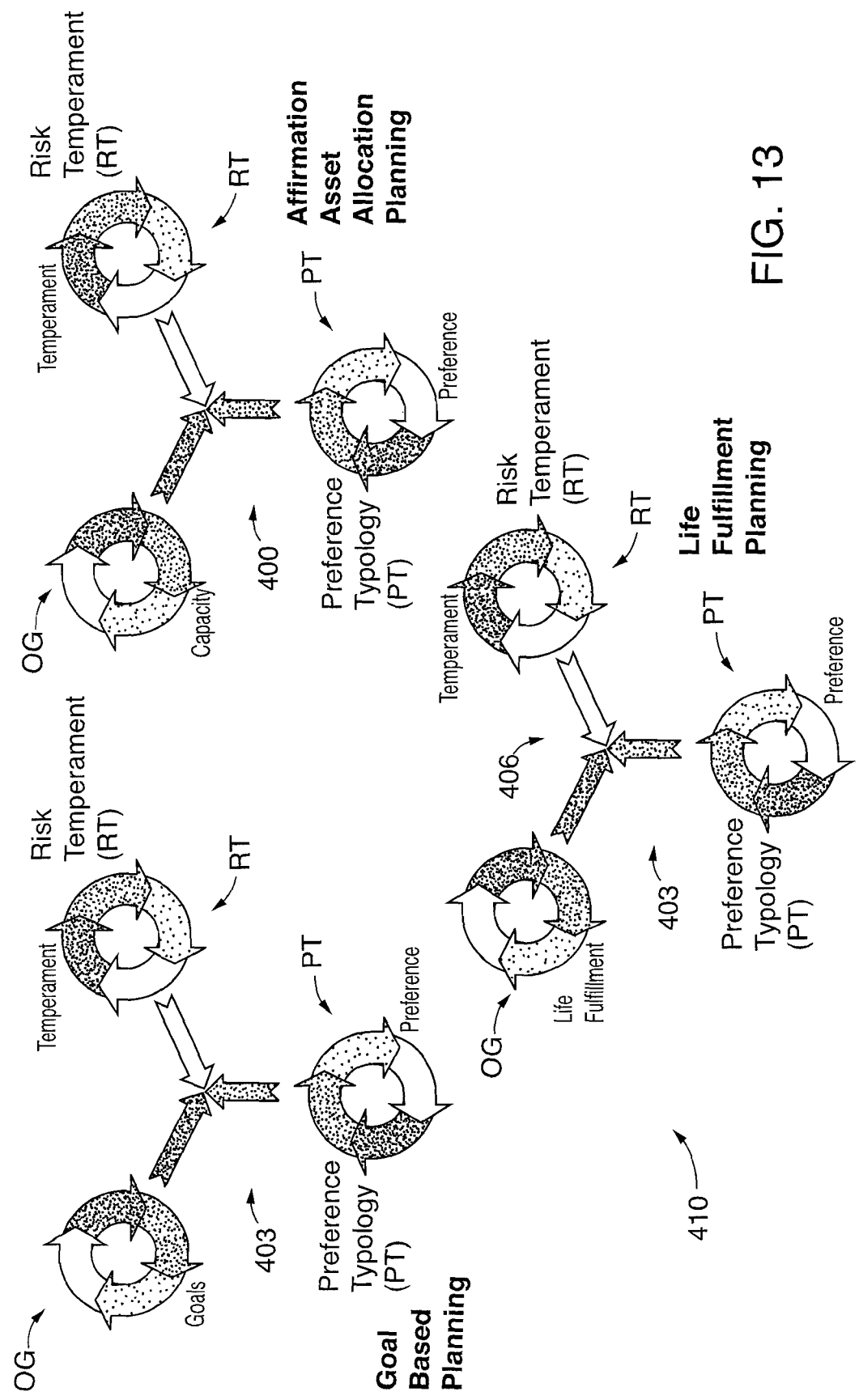
Figure 14:
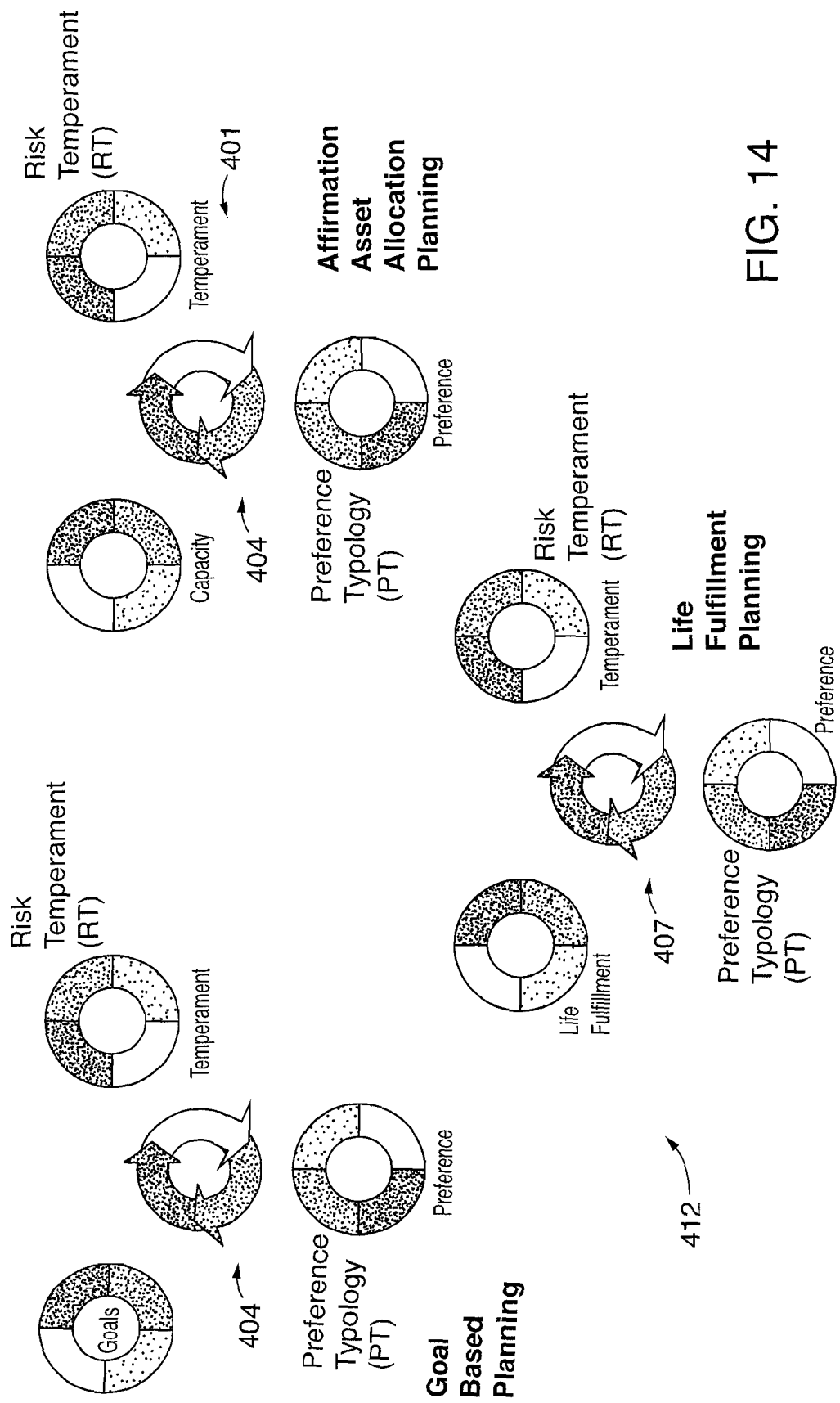
Figure 15:
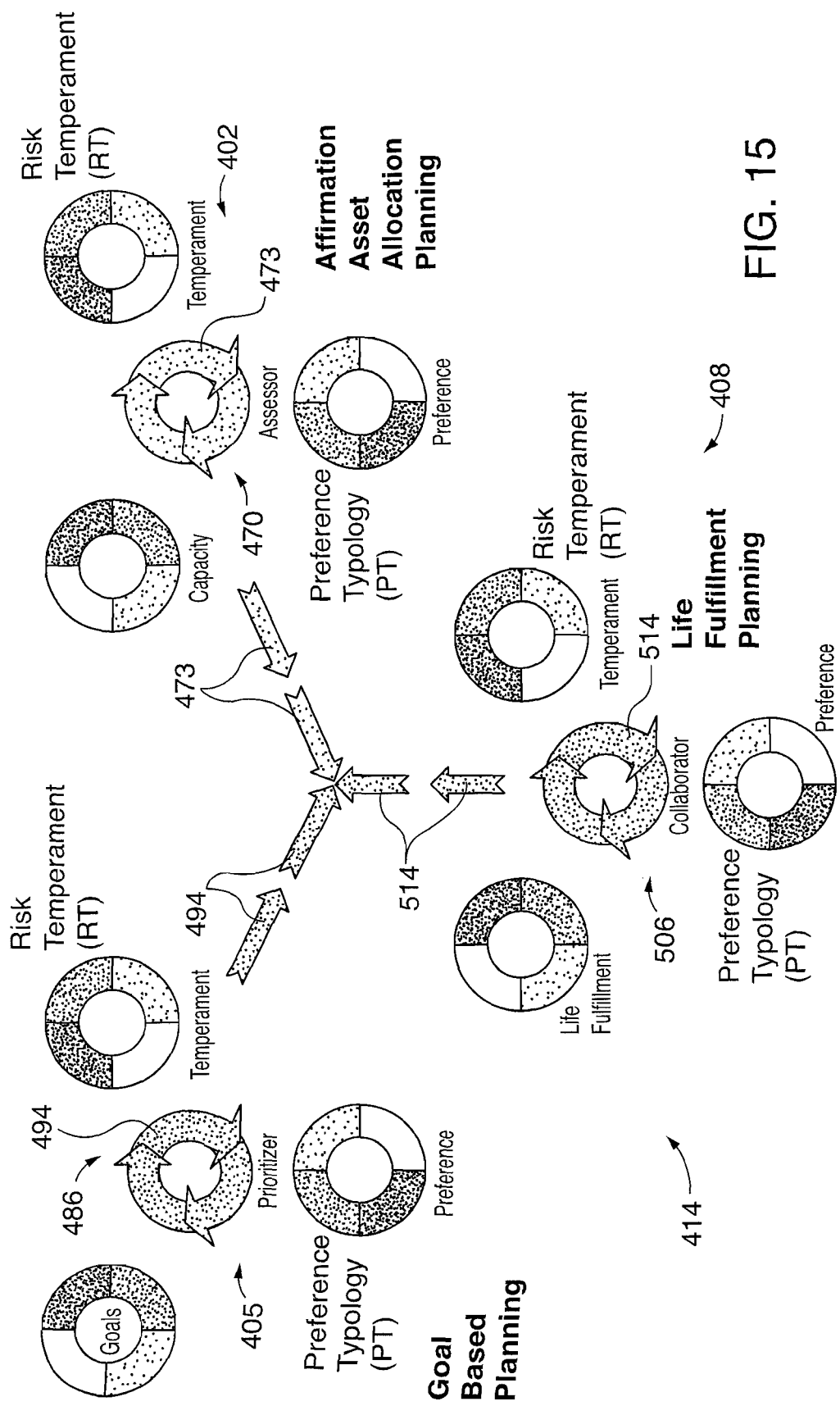

As previously noted, multiple simulations 300 respective output goals data sets (OGDS) 346 can be combined to determine a composite combined output goals (COG) data set for a decision making process. The COG simulation and corresponding data set generation steps can be shown visually on one or more HMI displays 94 of one or more computing devices 207, 209. FIGS. 13-16 illustrate an exemplary embodiment of the IILP simulation process (see Appendix III) visual image display as it transforms during the simulation. As shown in FIG. 13, visual screen displays of the three previously performed goal-based planning 403, affirmation asset allocation planning 400 and life fulfillment planning 406 are combined to form the composite display 410. As previously noted, the RT and PT weighted classifications are identical for each of the three displays 400, 403 and 406. The next IILP simulation display 412, shown in FIG. 14, is a composite view of the visual displays 401, 404, and 407. In FIG. 15, the moving, centrally pointing arrows of the display image 414 show the OG classifications "Prioritizer" 494, "Assessor" 473, and "Collaborator" 514 OGs in a manner that is similar to the displays 400, 403, and 406.

Figure 9:
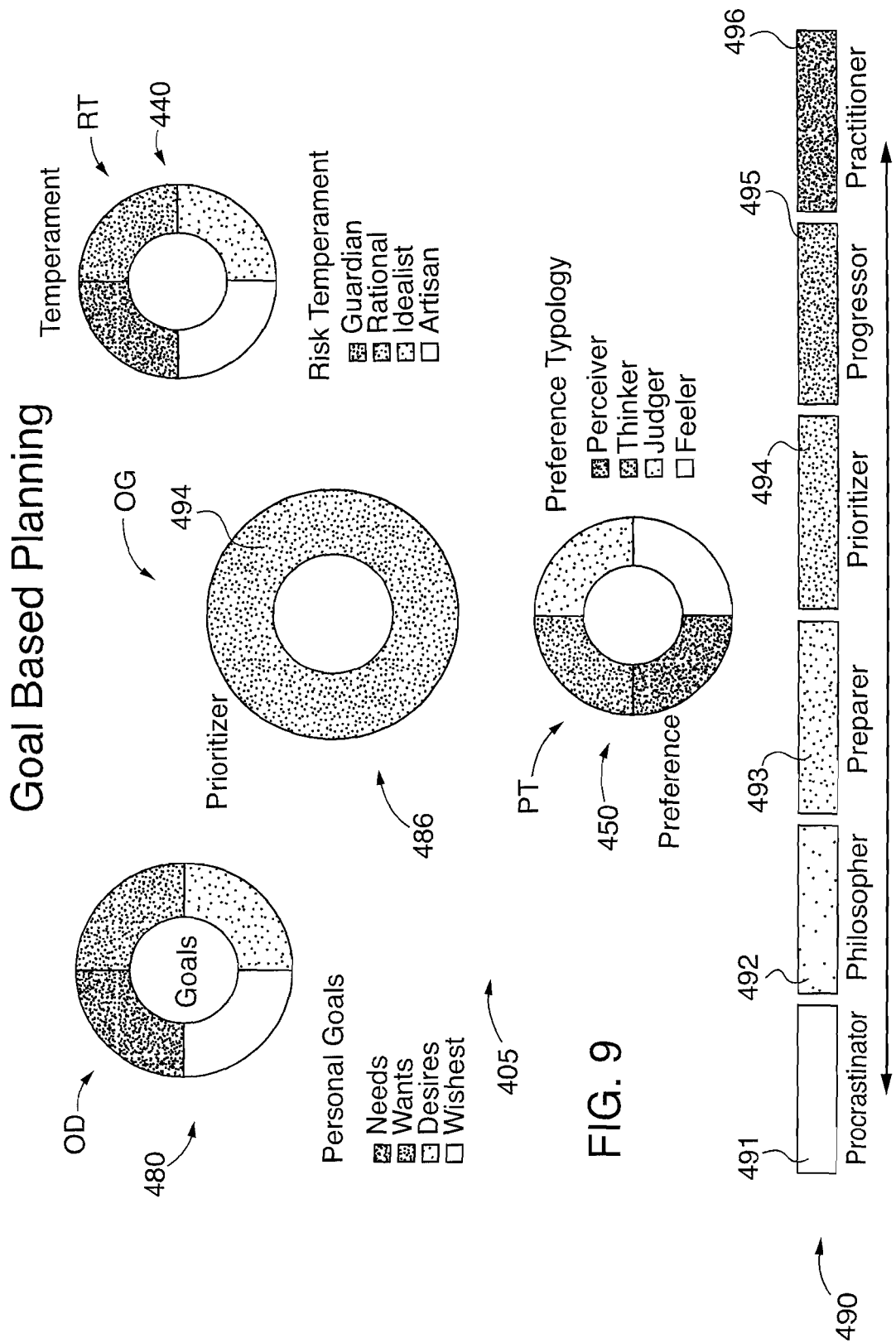
Figure 10:
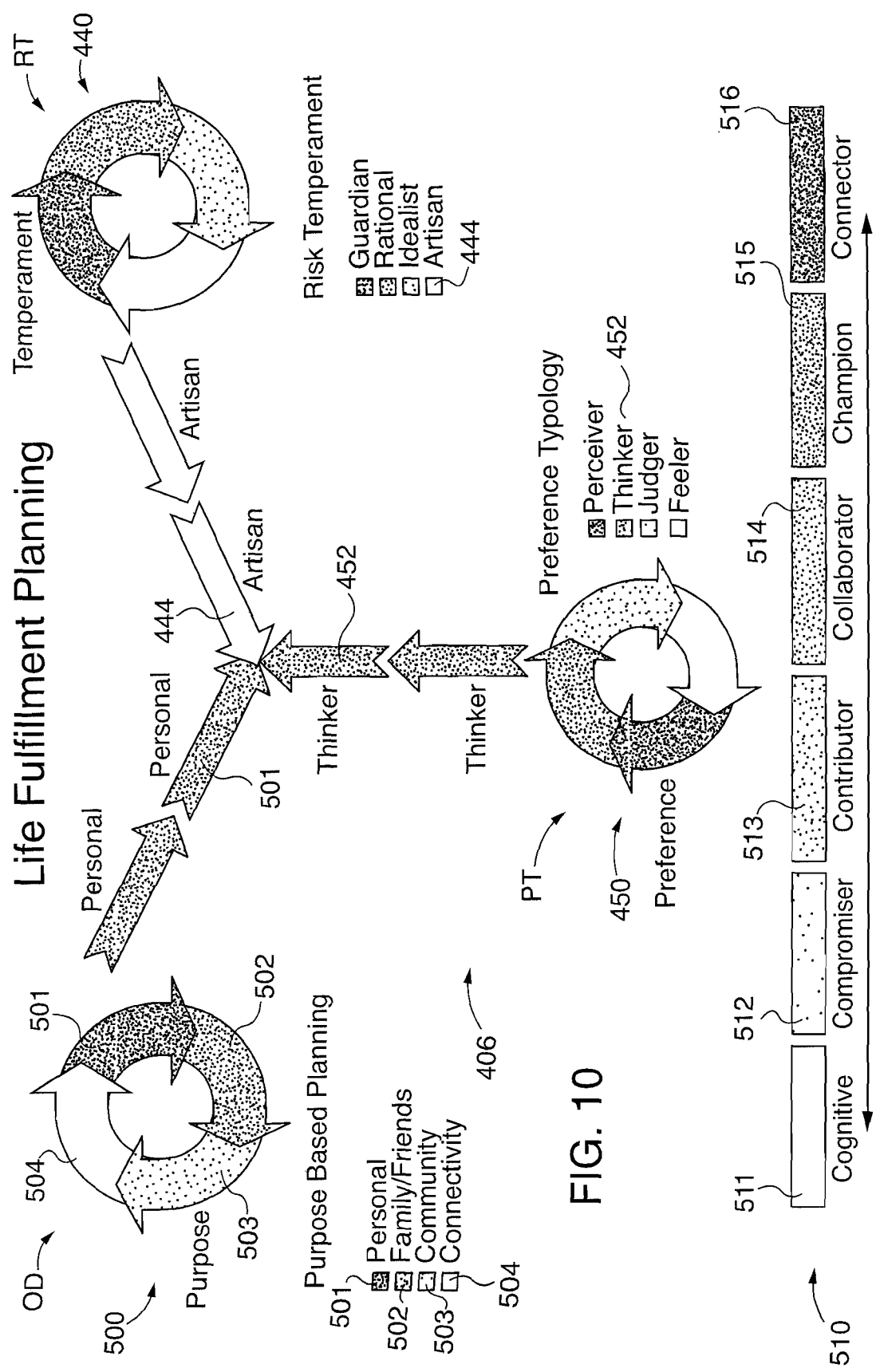
Figure 11:
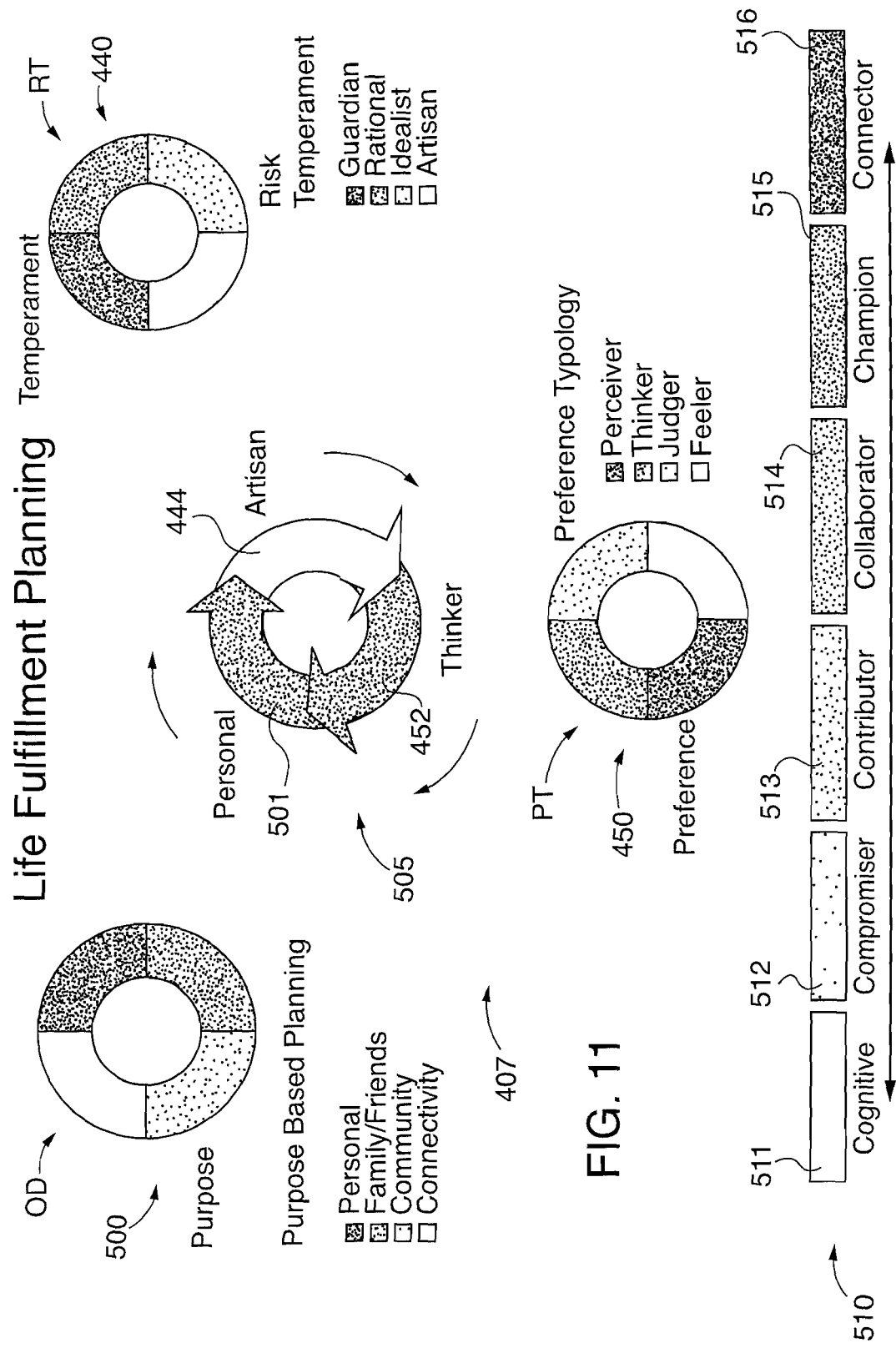
Figure 12:
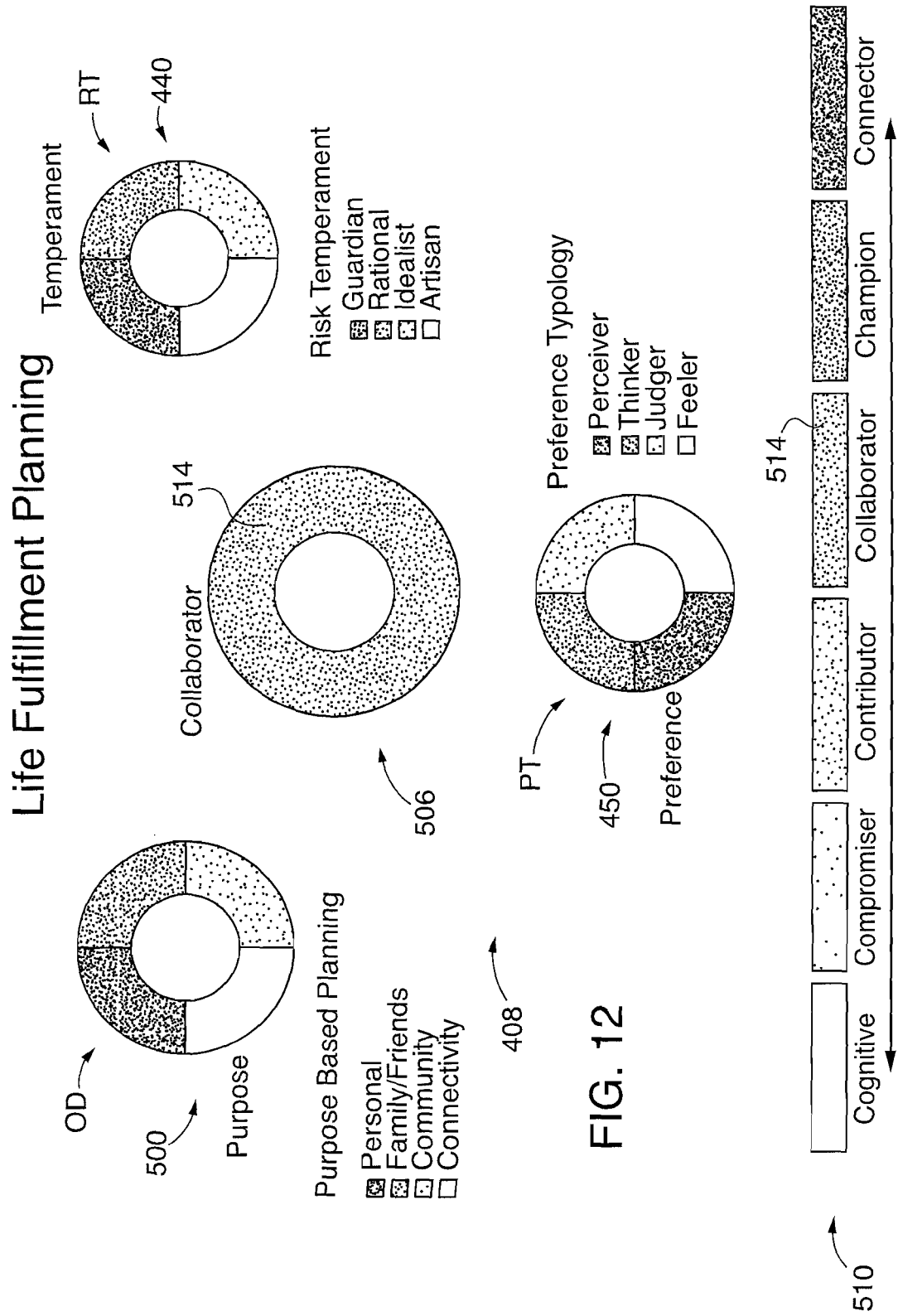
Figure 16:
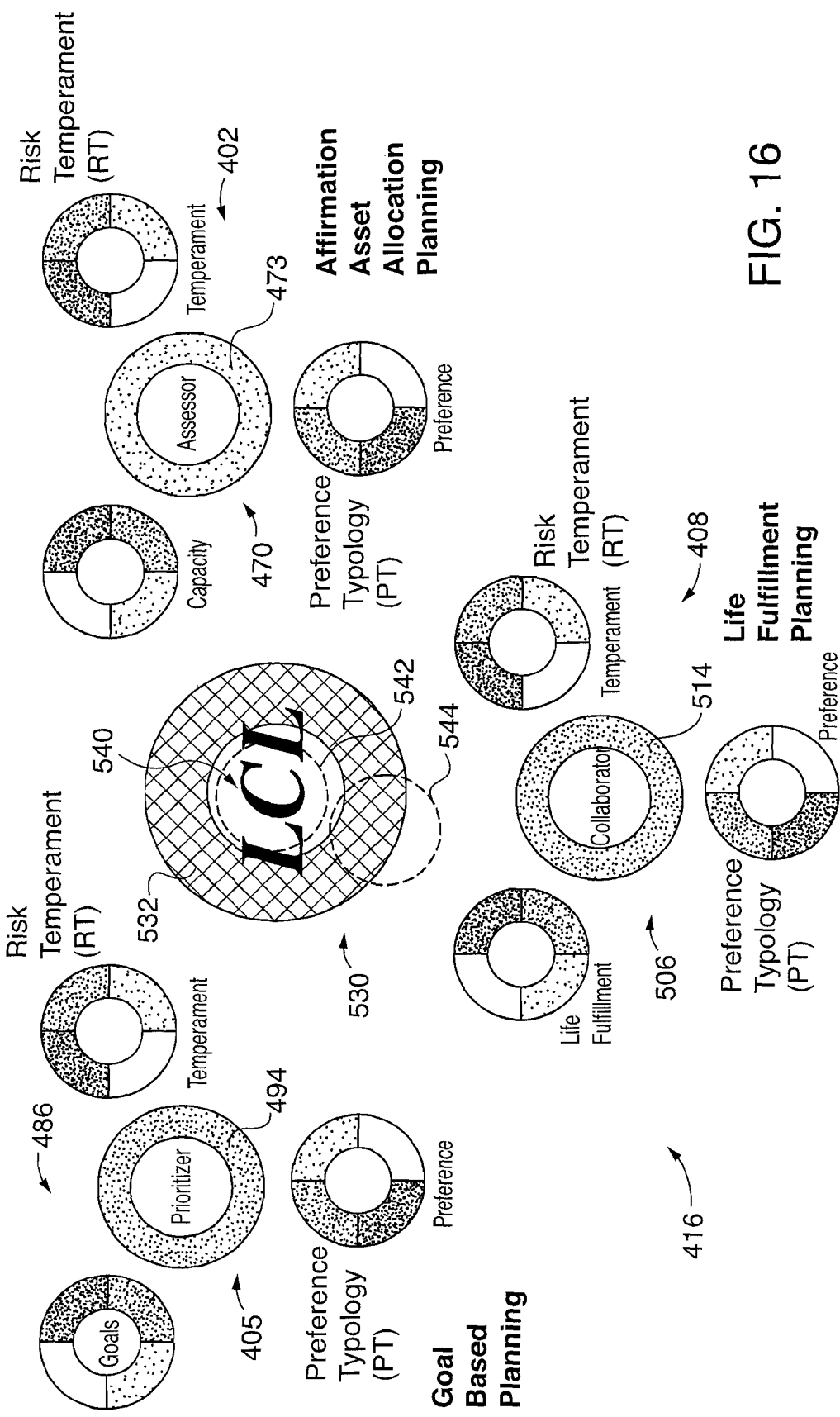

The display 416 of FIG. 16 ultimately shows the combined outcome goal (COG) 530, which includes the OG visual displays 402, 405 and 408 of respective FIGS. 6, 9, and 12. In this image display embodiment 416, the IILP or other types of combined outcome goal simulation utilize separate colors for each OG family. For example, the goal based planning OD wheel is purple, the OD wheel for affirmation asset allocation is blue, and the Life fulfillment planning OD wheel is red. In all three OG subsets of the COG, the RT wheels are yellow and the PT wheels are gray. The green color OG wheel 470 for affirmation asset allocation planning "Assessor" 473 classification is carried over from FIG. 6 display 402. The blue "Prioritizer" 494 classification blue wheel is carried over from the goal based planning FIG. 9 display 405, as is the orange color OG wheel 514 from the life fulfillment planning display 407 of FIG. 11. In exemplary embodiment, the COG wheel 530 is a brown-colored annular donut 532. In this embodiment, overall balance among the three planning sequences is displayed as a spirit bubble 540 in the COG donut, which is labeled "LCL" or Living Center Line. A balance outcome centers the sprit bubble in the COG donut 540, as denoted by the dashed-line circle 542. An off-balance outcome displaces the LCL sprit bubble, such as the dashed-line circle 544. An off-balance outcome is a visual flag or other communication enunciation to the client or facilitator that there is a deviation from the desired outcome. Then, the client or facilitator can investigate causes of and remediation efforts needed to achieve the desired outcome. Alternatively, the client or facilitator may determine that the decision-making plan needs re-evaluation and/or adjustment based on new developments. The LCL sprit bubble or other graphical display advantageously is viewable in real time by a client, as a status dashboard. When the client has multiple ongoing simulation goals, they can be selectively prioritized for display and update frequency.

In FIGS. 4-16, the displays confirm to a viewer that the psychological/behavioral-based RT/PT inputs (always yellow/gray in all displays) are used as identical weighting factors for all three of the affirmation asset allocation; goal based planning and life aspirational goal simulations. The RT/PT common color designation is repeated in all simulations in the respective right and bottom wheels of each display screen. In contrast, the color differentiation among the OD wheels 430, 480 and 500 in the left wheel location inputs are specialized for each of the simulations. Each classification factor is shown as a distinctively colored rotating wheel, with sectors on each wheel denoting a quantized classification of the client among a range of potential classifications. For simplicity, each wheel is divided into four sectors, denoted by milder to stronger color intensities. The weighting functions for each such simulation are triangulated. IILP simulation system's final COG simulation, FIGS. 13-16 and screen views 410, 412, 414 and 416 triangulate the prior three OG sub-simulations in the recursive sequence, with each OG wheel 486, 470 and 506 in a different color, while visually displays the simulation results as a bubble level in the COG donut 530. Balance among the planning simulations leads to a centered LCL bubble 407. Conversely, asymmetries in any of the planning simulations leads to an off-center bubble, indicating graphically to the client and investment advisors issues that need to be addressed to achieve desired balance. OD, RT and PT wheels are desirably displayed in different colors that when combined change to other colors that are easily visually perceptible as a transformative outcome. It is also noted that the LCL bubble 407 or other visual status display graphic symbol can aggregate multiple ongoing simulations in modular and recursive updates, as selected by the client.

As previously noted, multiple hierarchical levels and combinations of modular output goals (OG) can be aggregated to create new COGs. OGs and COGs can be combined on multiple hierarchical levels as new triangulated data points to create higher-level COGs through use of the unified simulator platform. By transferring the modular PT/RT/BDDS/OGDS/OG/COG data sets to other platforms, other facilitators can perform decision-making simulations for the same client. The modular data structure also allows the client to recombine the data sets, as desired, in order to generate his or her own new simulations. The simulator platform and remote dashboard COG spirit bubble display facilitates real-time simulation outcome status and display to a client. In this way, a client can initiate a query, or merely access a status update app on a smart device to determine whether one or more planning goals are on track and "balanced", or whether there are deviations that require investigation and correction.

Although various embodiments that incorporate the invention have been shown and described in detail herein, others can readily devise many other varied embodiments that still incorporate the claimed invention. The invention is not limited in its application to the exemplary embodiment details of construction and the arrangement of components set forth in the description or illustrated in the drawings. The invention is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted", "connected", "supported", and "coupled" and variations thereof are used broadly, and they encompass direct and indirect mountings, connections, supports, and couplings. Further, "connected" and "coupled" are not restricted to physical, mechanical, or electrical connections or couplings.

IILP Simulation Dashboard

Each element in the Individualized Life Plan will integrate into one technological platform, visible on the simulation screen of FIGS. 13-16. As this information is amalgamated and updated, a client will be able to see the interaction of the elements. When one factor (Holistic Based, Goal Based, and Purpose Based) is out of balance, the LCL leveler bubble 540 will move in that direction to demonstrate imbalance. If multiple factors are out of balance, the leveler will constantly be in motion to demonstrate this.

APPENDIX I

Risk Temperament Exemplary Questionnaire

1. What was the first purchase you ever made with your own money? How did you earn that money?

Artisan- Doesn't remember

Guardian- Focused more on how they earned they money than the actual purchase

Rational- Remembers the purchase

Idealist- Focuses more on how it felt to make their own purchase

2. What was happening in your career and family in October of 2008? What was happening around the family in the last 12 months?

N/A question refers to situations that do not change with temperament

3. Was there a point where you wanted to pull out of the stock markets? When was that? What led to that decision? Was it a fleeting thought or you took action?

Artisan- Fleeting thought, never acted

Guardian- Attempted to act, was likely talked out of it, or made adjustments- let go of alternative assets, as they are not "normal"

Rational- No, stayed the course

Idealist- Perhaps a fleeting thought, may have acted on it

4. What kind of lifestyle changes have you made since 2008? Have you postponed any purchases? What have you given up that you never thought you would? Have you re-educated your children on risk?

Artisan- No changes, lives in the moment

Guardian- Tightened the budget and worked harder

Rational- Re-evaluated and made some changes but not drastic

Idealist- No drastic changes, waiting for things to turn around

5. What kinds of changes did your social circle make? Ex- dinners out, travel, where they shop. Did you postpone any large purchases?

N/A- question is about other people

6. How risky do you think the market is right now? Do you think your portfolio has a lot of risk? Do you think there could be another market correction, inflation, or dollar devaluing?

Artisan- Probably do not know the answer to that, will defer to spouse or planner Guardian- Always thinks there is a lot of risk Rational- Believes the risk is calculated and necessary Idealist- Moderate risk 7. What have you learned about the markets over the last 12 months? Has the last 12 months fundamentally changed how you view investing? Add: Many of the smartest minds out there missed this black swan. NO ONE saw this coming.

Artisan- Nothing is certain

Guardian- Learned nothing really- they were always skeptical

Rational- Learned new types of risk (ex-Bernie Madoff) exist but remain convinced its all part of the system Idealist- Hurt emotionally by the greed of some and misfortune of so many 8. Would you say it is always better to have more? Even if what you have, is enough?

Artisan- Always wants more

Guardian- No- would be skeptical. Wants to know how the "more" was earned

Rational- Depends on the situation- what are the outside facts. Most likely wants more.

Idealist- Would want more for the right reasons

9. When a stop light has turned yellow, is it more your inclination to speed up or slow down? Does it ever depend on the situation?

Artisan- Speed up always, in a rush to do life

Guardian- Always slow down-that's what the law says

Rational- Depends on the situation. Is there a cop around? Are they late for a meeting?

Idealist- Would likely stops but would speed up for the right reasons (child sick in the car)

10. Assume three times your current worth. How would you feel if you lost 20% of that? How about 50%? How about 10%? How about 80%?

Artisan- Shrug their shoulders up to 20%

Guardian- Heartsick after 10% loss

Rational- Can tolerate larger losses- chalk it up to normal investing

Idealist- Tolerate a 20% loss

11. If money was not a concern, (Add a pause, make sure they are thinking) and your lifestyle had you traveling frequently, would you own or would you lease a plane?

Artisan- Lease, doesn't like commitment

Guardian- own- wants to make sure everything is running the way it should be

Rational- Must assess the situation and the costs of having a pilot and crew

Idealist- Most likely cannot answer the question or will think about it in terms of a car 12. When you go shopping for new clothes, are you drawn to classic choices, somewhat original choices, or do you always buy what you already know works?

Artisan- Trendy

Guardian- Same thing every time

Rational- Classic

Idealist- Original but comfortable

13. What types of sports do you like to watch? (Tennis, baseball, football) BACKUP QUESTION: how do you like to spend your free time? Do you take classes, play cards, or cook?

Artisan- Gymnastics, figure skating, horse racing; Arts and crafts, anything creativity related Guardian- Baseball, basketball, football, finance and commerce, volunteering on city council, highly respected in community Rational- Hockey, Boxing, Car Racing; Science and research Idealist- Golf, cycling, skiing, volunteer work, active in community 14. How was wealth discussed in your family growing up? How do you/ did you discuss it with your children? Were you a product of Great Depression parents? How did their views affect you? Who do you consider had it worse, people in 1929, or people in 2009?

N/A Question is about other people

15. Did you have any wealth transferred to you from a family member? Do you have any desire to do the same?

Artisan- Doesn't plan for that

Guardian- Yes and wants trusts to be set up ASAP

Rational- Depends on what happens in bucket 3

Idealist- Yes

16. Did you have any fear about being de selected from your career? Do you still have that same fear? Was it always there or it increased in 2008?

Artisan- Doesn't plan for that- feels they will be able to get another job anyway Guardian- yes and it does not matter that it was 2008. In addition, will have a huge safety account or desire a safety account Rational- Healthy fear- it was greater in 2008, probably still remains but has diminished some Idealist- yes but likely works in a "Safer" field (teaching, counselor)

17. Imagine you walk into a travel agent's office. Do you know where you want to go? Alternatively, do you leverage their knowledge on where you think you would like to go?

Artisan- Leverages knowledge

Guardian- Knows where they want to go and have probably been there before

Rational- Knows where to go but is open to suggestions about how to get there

Idealist- Knows where to go but is open to suggestions on other places

18. Do you prefer active or passive vacations? Ex- skiing or laying on a beach

N/A both types of vacations are possible for all types

19. When are you going on this vacation, now or in ten years?

N/A will depend more on holistic life stage

20. How do you feel about tobacco companies? How about General Electric? Did you know that sometimes GE is considered a "defense stock?" How do you feel about them now? Do you care how a company makes a dollar regardless of how they make it?

Artisan- Doesn't mind them, doesn't think about it

Guardian- Okay with them as long as they disclose the dangers

Rational- Believes they are necessary for the economy and jobs

Idealist- Hates them- social badness

21. Have you or a family member ever had a scary health issue? How did you get through that and what do you know now that you wished you had known then?

Artisan- Total disbelief

Guardian- finds the best doctors

Rational- gathering facts about the situation

Idealist- Prayer or belief in power of goodness

22. What kind of non-financial emergency "funding" do you have? By that we mean, where is your support system? (family, friends, hobbies, pets)

Artisan- Hobbies

Guardian- Family and community

Rational- Combination

Idealist- Community friends and places of worship

23. Suppose client that you have a long weekend planned with spouse-partner in NYC and you live in California. On your way to catch your flight, your boss calls with an emergency project. Do you, tell your partner/spouse that you cannot go, tell your boss you cannot help this time, or take the time on the flight to try to complete the project though you are not positive it will be enough time.

Artisan- Vacation

Guardian- Work

Rational- Combination

Idealist- Combination

24. How easily do you adapt when things go wrong? For example, it is your daughter's wedding this weekend and the hotel just called to tell you that their water will be out all weekend. Are you angry, devastated, laughing... How long do you feel this emotion? How easy is it for you to see a solution to this problem?

Artisan- Adapt and Laugh

Guardian- Does not adapt; takes a while to get over it but sees solutions easily. More concerned with hotel "doing what's right" and being compensated Rational- Angry at first but quickly sees solution Idealist- Adapts but does not always see a fair solution (daughter will never get that day back)

25. Imagine you receive a promotion at work. In order to receive this promotion you must work on commission. Do you reject the promotion to keep your safe salary, take the promotion as you may earn more with commission? The silent answer not given is to negotiate for both. Do you see not taking the promotion as risky? What are the consequences for not taking the promotion?

Artisan- Take the chance

Guardian- Does not take promotion

Rational- Takes promotion but negotiates for different terms

Idealist- Takes promotion because feels the team needs them

26. How do you feel about lending money to your family or close friends? There is no right answer here!

Artisan- Depends on the circumstance but may request repayment with interest or believe in "I scratch your back; you scratch mine".

Guardian- Fine with it as long as there is a "plan" also depends on why that person needs money Rational- Does not like it Idealist- Has no problem with it 27. How does your household balance career and family?

Artisan- Work it out as it goes

Guardian- Everyone has their role and must stick to it

Rational- Organizes the schedule around circumstance to make it work

Idealist- Tries to make sure everyone is just happy

28. Do you prefer a large party or a small gathering?

Artisan- Large

Guardian- Large

Rational- Small

Idealist- Small

29. Imagine you are on a casino floor. What game do you see yourself playing?

Artisan- Roulette or craps

Guardian- Blackjack or nothing

Rational- Blackjack or craps

Idealist- Slots or disagrees with gambling

30. Have you ever been mugged, robbed, or something stolen from you? How about something taken from your home? How long until you felt comfortable again? What kind of feelings did that spark? (Did you consider moving? Did you put in an alarm? Did you take a different path to work?) Follow up questions Artisan- No changes- think it was a fluke Guardian- Lock down mode and scared for some time. If it happens once, likely to happen again Rational- Make minor changes to be more secure but is prepared if it happens again Idealist- More distraught over the fact that someone would do that than the actual loss itself 31. What was one of the hardest decisions you have ever had to make? How long did it take you to make that decision? What went into that decision?

Artisan- Decision was probably never made unless someone made it for them

Guardian- Decision was made after great deliberation

Rational- Facts received, decision made quickly

Idealist- Decision made quickly based on gut instinct

32. If you were taking a test and spent the time to be well prepared and you saw a person looking at your paper, what would you do? What if the person looking was a friend or a relative?

Artisan- Doesn't care if someone looks but will likely feel that gives them the right to look back Guardian- Takes great care to hide the paper even if it is family or friend, cheating is against the rules Rational- Hides the paper regardless unless there is a good reason why someone is looking Idealist- Allows family and friends to look 33. How do you personally define the term "risk"? (Market, principal protection, systemic risk, non-systemic risk)

Artisan- Chance

Guardian- Scary

Rational-Opportunity

Idealist- Necessary

34. Suppose your job is being eliminated. They offer you another job at 50% of your current salary. Would you take the job being offered? Look for another job? Both?

Artisan- Look for a better opportunity

Guardian- Take job- likes security of knowing money is coming in

Rational-Take job but will negotiate for better terms or take job and look for new at same time Idealist- Depends on what kind of job 35. Suppose you find out that a relative you do not know has left you a small family business in his will. This business has not been profitable in years but it is located in a very up and coming area. If you sell the business now, you will receive $250,000. However, if you spend $100,000 on this business, there is a chance you will be able to sell it for $500,000 in the future. Which would you choose?

Artisan- Will not want to be tied to business but will look closely for profits

Guardian- Sell business

Rational-Build the business

Idealist- Depends on the type of business, most would sell

36. Regarding your current net worth, which is more of a concern for you? That inflation will affect your purchasing power or you will lose too much in the stock market?

37. There are many ways available for people of high net worth to place their assets in such a way that they will receive tax benefits from the government. However, changes in legislation can sometimes leave the client worse off than if they had done nothing. Do you arrange your assets for tax breaks? Is this something you would consider?

APPENDIX II

Preference Typology Exemplary Questionnaire

In action, which of these best describes you?

1. Practical and opportunistic
2. Compassionate and Altruistic
3. Dutiful and Diligent
4. Efficient and Pragmatic Answer_____

Which of these would you rather study?

1. Arts and Crafts
2. Literature and Humanities
3. Business and Finance
4. Science and Engineering Answer_____

Which of the following are you most likely to trust?

1. Impulses and whims
2. Intuition
3. Customs and traditions
4. Reason and logic Answer_____

You do best in jobs working with which of the following?

1. Tools and equipment
2. Human resources
3. Materials and services
4. Systems and structures Answer_____

As a guide to take action, which of the following, do you, tend to reference?

1. The immediate advantages

2. Future possibility

3. Past experience

4. Necessary and sufficient conditions

Answer_____

When thinking about misfortune you have faced you tend to

1. Laugh it off

2. Wonder why

3. Try to make the best of it

4. View it from a wide perspective

Answer_____

When ending a conversation, we traditionally say, "Have a nice day". If you could customize that, what would you prefer to say?

1. Have a fun day

2. Have an inspiring day

3. Have an interesting day

4. Have a productive day

Answer_____

When learning a new topic, which way do you learn best?

1. Listening

2. Touching

3. Seeing

4. Doing

Answer_____

When something does not make sense, which of the following would you choose to better your understanding.

1. Decide it does not matter

2. Ask a friend

3. Independent research via books or internet

4. Ask an expert

Answer_____

When you are (or were) preparing for an annual performance review, which of the following would you bring as supporting evidence to your accomplishments?

1. Sales numbers

2. Documentation of teamwork and assistance

3. Spreadsheet or quantitative data

4. Detailed accomplishment list

Answer_____

PT Classifications for above questions:

1= Thinker

2=Feeler

3=Perceiver

4=Judger

APPENDIX III

RPH Financial Services, Inc.

*Living Center Line* <sup>SM</sup>

Integrated Individualized Life Planning (IILP) Simulation Process

*Living Center Line* <sup>SM</sup>, Integrated Individualized Life Planning (IILP) process is an engaging 3-step process that involves three critical elements of your life, carrying the greatest amount of potential consequences. These three elements form a triangulation to provide you with your own personal GPS-like navigation system. The RPH triangulation formula amalgamates these three life reference points to provide a tool for allocating your most important asset (your time) and where to direct it most efficiently, allowing you to find greater balance in your life. This GPS-like system provides a sensory real-time feedback guidance system, which keeps you on target and centered. This process transcends into creating your personal trilogy, putting you on your path to live the enriched life that you are entitled.

The Affirmation Asset Allocation Simulation Process

The Affirmation Asset Allocation (AAA) process is a 3-step process that allows for the combination of behavioral finance with the traditional mean variance analysis, creating a 3-dimensional Investment Policy Statement and Guide.

1. Fact Gathering – this includes the following:

Risk Temperament Questionnaire: Delivered via teleconference with an RPH analyst. Designed to measure individual risk temperament, this features a series of open-ended questions. Results classify clients into one of four categories depending on reactions and responses to outcomes of uncertainty. Completion time is approximately 45 minutes.

The Typology Questionnaire: Delivered after the Risk Temperament call, administered personally, via email, or by secure Web portal access. Utilizing a series of 10 multiple-choice questions, this tool is designed to measure individual processing of information that provides insight to the on-going servicing of the relationship. Completion time is approximately 10 minutes.

Financial Holistic Goals: The traditional suitability section of financial consulting (age, wages, expenses, goals) which is revealed through a questionnaire format for new clients, while existing clients have shared this information through their ongoing and lasting relationship with RPH.

2. Investment Policy Statement (IPS) - This is the foundation of the Affirmation Asset Allocation process. Written after the questionnaires have been analyzed and internal meetings of RPH staff has taken place (2-4 weeks). The IPS is a fluid document that serves as an ongoing roadmap for Affirmation investing. Its purpose is to take the traditional, institutional mean-variance investment application and overlay it with behavioral finance reference points (Risk Temperament and Preference Typology). This translates it into a three dimensional (triangulated) roadmap for each individual client's personal investing. The process itself will classify all clients into one of six Affirmation models that allow for strategic, dynamic, and tactical investing. The IPS outlines how RPH affirms where one is on the risk spectrum and how we work together to maintain that Affirmation.

3. Funding Location Analysis - This is the final stage in the Affirmation Asset Allocation process when the implementation of the Affirmation takes place. The goal of this section is to show the most prudent way to reallocate assets into the Affirmation Asset Allocation. While the IPS outlines what the desired AAA, the funding location outlines how to get there from both an economic and tax standpoint, beginning with a client's current allocation. This is a very detailed analysis that shows all dollar amounts simultaneously (vs. sequentially), across each registration and account, and attempts to account for cash flow planning and future capital expenditures. This is the last step before actual client investing in accordance with the Affirmation Asset Allocation begins.

Goal Based Financial Planning Simulation Process

For over 30 years, the guiding philosophy of RPH has been to manage prudently wealth and achieve a better life balance for our clients. The process is tailored to each individual client and his or her unique circumstances. RPH is a paradigm creator in its approach to focusing not only on a client's current financial position, but also on their entire life plan. This is an overview of the steps in the Financial Planning Process.

• Fact Gathering
1. Quantitative and Qualitative
2. Certain documents provided by clients

• Educational Briefings
1. Financial Planning concepts and theories

Net Worth Analysis

Asset Planning

College Planning

Employee Benefit Planning/Contract Negotiating

Estate Planning

Retirement Planning

Special Needs Planning

• Collaborative Feedback
1. Implementing plan and timeline for completion
2. Working with clients, attorneys, accountants, employer human resources representatives, etc.

• Monitoring
1. Systematically monitor and review Financial Plan making appropriate changes as goals and circumstances change
2. Undertake holistic approach customized individually for each client's short-term and long-term needs.

Timeline for Educational Briefings:

Net Worth Analysis

One session to analyze net worth in multiple categories.

Asset Planning

Three sessions pertaining to the AAA process

College Planning

One session addressing 529 plans, UMGA, UTMA, 2503(c), and tax alpha portfolios

Employee Benefit Planning/Contract Negotiating

One or two sessions covering 401(k) allocation, LTI election planning (ISO, NQ, RSU, RSA, SAR), pension planning, deferred compensation, FSA, LTC, LTD and contract negotiation Estate Planning One or two sessions to analyze current estate documents and provide feedback Retirement Planning Multiple sessions to discuss various retirement planning scenarios, income replacement, and Social Security optimization Special Needs Planning One or two sessions to prepare for weddings, family care (parents, siblings, special needs children), travel, starting your own business, unexpected events, career changes, etc.

Personal Goals Simulation OD Input Classifications:

Needs: Primary concern

Wants: Secondary focus

Desires: After Needs and wants are addressed, desires can be factored in

Wishes: Last in the hierarchy of addressing personal goals

The OD input factors are determined through capital needs analysis. Once wealth accumulation meets basic needs, the client moves to a higher-level goals OD factor. At "wants" level OD the client can spend on things that he or she wants to do: better vacations, upgrading their children's college or private school. If those have been addressed then the wheels stop at desires, which can be a second home or learning to become a pilot, going back to college. Then wishes are at the lowest hierarchy for financial goal planning.

The Goals Based Planning simulation ultimately generates six objective goals (OG) classifications. There are more OG classifications that OD inputs, in order to create a higher resolution decision-making spectrum. In the financial services context, higher OG output resolution facilitates increased solution flexibility, for example to generate asset allocation options and percentage allocation bandwidths for each such option.

[0034] Exemplary OG classifications for the Goal Based Planning simulation are:

Procrastinator:

•To be slower or late about doing something that should be done

•To put off intentionally and habitually

Pleasure principle maybe responsible for procrastination; one may prefer to avoid negative emotions and to delay stressful tasks.

Philosopher:

•A person who seeds wisdom or enlightenment

Philosophy is the study of general and fundamental problems, such as these connected with reality, existence, knowledge, values, reason, etc. Philosophy is distinguished from other ways of addressing such problems by its critical, generally systematic approach and its reliance on rational argument.

Preparer:

•To make ready beforehand for a specific purpose

Prioritizer:

• To arrange or do in order of priority

•To organize things so that the most important thing is done or dealt with first Skills that you needed to make the very best use of one's own efforts and those of family members. In addition, a skill needed to create calmness and space in life, so that one can focus your resources/energy and attention on matters of personal importance.

Progressor:

•Moving forward or towards a place

•A forward or onward movement

•A movement toward a goal or to further a life stage

•The development of an individual in a direction considered more beneficial than and superior to the previous level Practitioner:

•A person actively engaged in an art or discipline or an activity that requires skill or practice The advisor first has to create the foundation in regards to the goals that are needs. Then you gradually move to wants and classify what some of the clients wants are, then desires and lastly wishes. The advisor has to look at where the client's resources (financial, intellectual and personal) are going to and the level of resources the client is working with. Some people live in the moment more and do not plan for the destination. The client and the advisor would then have to redirect the client's goals and trajectory toward looking at retirement planning and backing off on immediate gratification. The reverse is if the advisor realizes the client is saving more than what is necessary through the use of financial planning software. In this case, the client and advisor want to address that and look at some of their wants and then potentially look at desires and wishes. Therefore, it is a priority classification graduating from one-step to the next but always starting at the basis of the primary needs and then moving from there.

If there is an imbalance in the leveler, it could be because of some planned expenditures of goods or services over their allotted amount of money for that goal. It could be that they potentially inherited an inheritance or received a lower inheritance than was planned that creates the leveler to be off. Getting a greater rate of return than what was in the planning process, or getting a lesser rate of return could cause the leveler to be skewed. If inflation is higher than what was in the plan, forgetting to contribute $5,500 for the catch-up now that they are older than 50 will cause the leveler to be imbalanced to trigger well where they should be looking and uncover that they are not making the full contribution in the catch-up.

These changes to a client's goals will be captured in a census created by the advisor (RPH). The client will go to a secure online portal to complete and update this census. The answers to the census will somehow integrate with Money Guide Pro or some other financial planning software, which will then help analyze the impact of changes and run sensitivity studies. This will generate an alert to the advisor that they should contact the client to help them customize and align their goals with their resources.

*Life Fulfillment Planning*[SM]

Purpose-Based Planning Simulation Process

Recent research has shown that genetics play much less of a role in longevity. Approximately 70% of one's longevity is due to their psychological and physical environment. Researchers have uncovered "Blue Zones": communities in the world where the majority of individuals live to be 100 or older. There appear to be several common factors in all of these disparate global zones. Purpose Based Planning isolates social and psychological factors such as being at peace with oneself and extending that peace and harmony with friends, family, and community and incorporating a high level of spiritual connectivity.

RPH seeks to leverage a client's risk temperament and typology to deliver focus on each of the elements of purpose (family, relationships, community, and spiritual connectivity). If one does not have personal balance (Personal), or they do not value themselves they cannot value others. We want to start with that being the basis to then life coach the client in this tier factor of importance starting with one's self, getting harmony with one's self and then to family, friends and community and spiritual connectivity.

Purpose-Based Planning Simulation Process Simulation OD Input Classifications:

1. Personal
2. Family/Friends
3. Community
4. Connectivity

The Life Fulfillment Planning simulation ultimately generates six objective goals (OG) classifications. There are more OG classifications that OD inputs, in order to create a higher resolution decision-making spectrum. In the financial services context, higher OG output resolution facilitates increased solution flexibility, for example to generate asset allocation options and percentage allocation bandwidths for each such option.

[0034] Exemplary OG classifications for the Life Fulfillment Planning simulation are:

Cognitive:

Cognitives use existing knowledge to generate new knowledge. They rely heavily on logic in their decision-making. Cognitives would tend to be more focused on their personal skills, knowledge, and experience. They tend to be more introverted than many other groups.

Compromiser:

A compromiser is someone who negotiates and comes to an agreement through communication, and finds a mutual acceptance of terms--often involving variations from an original goal or desire. Compromisers will tend to make personal sacrifices for loved ones (family and friends).

Contributor:

A contributor is a person who is instrumental in the growth of something, especially in its early stages. Committed to the responsibilities of his or her role. Proactively takes up work. Focuses on "we" not "I". Contributors are more community focused and act with a larger purpose.

Collaborator:

Collaborators have a personality gift called sociability. This characteristic allows them to use their influence on people to get what they want. They would prefer to participate in community related events; provided they have structure already in place and the positive impact is known or measurable.

Champion:

Champions tend to think of their world in a larger sense than many other types. They are driven to help, not only their personal circle or community but on a global level. Champions prefer to spend time to refine their ideals and take the energy that they derive from this process to fuel change.

Connector:

The kind of person with a truly extraordinary knack of making friends and acquaintances. Connectors make change happen through people. Connectors find fulfillment through engaging with their large network in order to foster new relationships and innovation.

The leveler really encompasses health, leisure, learning, and inner growth. The goal for the advisor or the individual is to get people out of their comfort zone, creating a greater bandwidth; no one can reach their potential in life without stretching their capacity from birth. Another census will be created to reflect the changes that affect a client's purpose based goals. The client will complete and update as needed and this will integrate with another software platform to confirm that they are "in balance".

Once individuals knows where they fall within the six Life Fulfillment Planning classification spectra, the goal is to enhance or uncover for the first time "Purpose in Life", utilizing heuristic modeling and mind mapping as the tools for amplifying clients who already have clarity around their purpose and for those who are unclear in discovering theirs.

IILP Simulation Dashboard

Each element in the Individualized Life Plan will integrate into one technological platform, visible on the simulation screen of FIGs. 13-16. As this information is amalgamated and updated, a client will be able to see the interaction of the elements. When one factor (Holistic Based, Goal Based, and Purpose Based) is out of balance, the LCL leveler bubble 540 will move in that direction to demonstrate imbalance. If multiple factors are out of balance, the leveler will constantly be in motion to demonstrate this.

What is claimed is:

1. An electronic simulator tool comprising:
a controller platform utilizing an operating system and microinstruction code for generating, storing and accessing a reusable behavior-influenced decision-making data set (BDDS), the controller platform including:
  a communication bus for effectuating communication between a plurality of separate devices, the plurality of separate devices including
  a first memory element for storing a predetermined set of risk temperament (RT) classifications that are indicative of an individual human's behavioral mood, or attitude for perceiving and processing events with uncertain future outcomes while in an affectively aroused emotional state and a predetermined set of preference typology (PT) classifications that are indicative of an individual human's behavioral and psychological preferences for absorption of information, to help that individual in the future to evaluate and resolve uncertain outcome events;
  a second memory element for storing a predetermined set of questions used in evaluating the individual client, the set of questions including a subset of RT questions and a subset of PT questions; the RT questions including open-ended questions concerning how the individual, while in an affectively aroused emotional state, historically has made and/or hypothetically would make behavioral decisions about events with uncertain outcomes; and the PT questions including a set of multiple choice questions to elicit how the individual absorbs information and takes action upon absorption of such information;
  a client input interface for providing a communication path between an individual client's communication device and the controller platform;
  a processor responsive to microinstruction code for performing a BDDS compilation by:
    receiving responses to the predetermined set of questions from the individual client via the client input interface;
    processing the responses to generate an RT value and a PT value for the individual client;
    comparing the RT value to the predetermined set of RT classifications to select an individualized RT classification for the individual client;
    comparing the PT value to the predetermined set of PT classifications to select an individualized PT classification for the individual client; and
    defining the respective individualized RT and PT classifications as a generated BDDS profile for the individual client, the generated BDDS profile defined as a modular, reusable BDDS profile available for use by the individual client in various future situations;
  a third memory element for storing the generated modular, reusable BDDS profile for the individual client; and
a facilitator output interface for allowing third party access to the modular, reusable BDDS profile, in communication with the third memory element, for use by the third party in various, different client treatment planning situations, without requiring repetition of the BDDS compilation process.

2. The electronic simulator tool as defined in claim 1 wherein the facilitator output interface to the third memory element permits only third parties authorized by the individual client to access the modular, reusable BDDS profile stored in the third memory element.

3. The electronic simulator tool as defined in claim 1 wherein the processor is further responsive to microinstruction code to generate an output goal data set (OGDS) by:
  accessing the third memory element and retrieve the modular, reusable BDDS profile;
  receiving, via the client input interface, a set of objective decision-making client data associated with client planning as defined by a third-party facilitator;
  weighting the received set of objective decision-making client data by the client's individualized PT and RT classifications stored in the modular, reusable BDDS profile to create a set of resultant output goals specific to the client planning purposes of the third-party facilitator; and
  generating, as an output, the output goal data set (OGDS) associated with the received set of objective decision-making client data.

4. The electronic simulator tool as defined in claim 3 wherein the processor is accessible via the facilitator output interface by a plurality of different authorized third-party facilitators all associated with the same individual client, each third-party facilitator using a different set of objective decision-making client data, wherein each third party facilitator accesses and uses the same modular, reusable BDDS profile and the respective individualized RT and PT classifications stored therein to create different OGDSs, eliminating a need to repeat BBDS compilation for each different set of objective decision-making client data used to create each different OGDS.

5. The electronic simulator tool as defined in claim 1 wherein the plurality of devices accessible along the communication bus collect updated answers to selected ones of predetermined set of questions from the client via the client input interface and generate an updated individualized RT classification to replace the individualized RT classification currently stored in the modular, reusable BDDS profile in the third memory element.

6. The electronic simulator tool as defined in claim 1 wherein the set of predetermined questions stored in the second memory element further comprises:
  the subset of RT questions including questions concerning recollection of and reaction to: past emotional events, and/or abrupt investment market declines, and/or decisions to change lifestyle spending, and/or actual or potential loss of employment; and/or career setbacks, and/or illness of self or of family members; and/or relationship changes, and/or births or deaths of family members, and/or life regrets, and/or vehicular operation; and
  the subset of PT questions including multiple choice questions concerning self-evaluation of personal character traits, and/or activity preferences, and/or learning methodology/subject matter preferences, and/or information evaluation preferences, and/or communication style preferences, and/or past coping in response to adverse outcomes.

7. An electronic simulator visual display system for generating visualization output comprising:
a controller platform utilizing an operating system and microinstruction code for generating, storing and accessing a reusable behavior-influenced decision-making data set (BDDS), the controller platform including:

a communication bus for effectuating communication between a plurality of separate devices, the plurality of separate devices including a first memory element for storing a predetermined set of risk temperament (RT) classifications that are indicative of an individual human's behavioral mood, or attitude for perceiving and processing events with uncertain future outcomes while in an affectively aroused emotional state and a predetermined set of preference typology (PT) classifications that are indicative of an individual human's behavioral and psychological preferences for absorption of information, to help that individual in the future to evaluate and resolve uncertain outcome events;

a second memory element for storing a predetermined set of questions used in evaluating the individual client, the set of questions including a subset of RT questions and a subset of PT questions; the RT questions including open-ended questions concerning how the individual, while in an affectively aroused emotional state, historically has made and/or hypothetically would make behavioral decisions about events with uncertain outcomes; and the PT questions including a set of multiple choice questions to elicit how the individual absorbs information and takes action upon absorption of such information;

a client input interface for providing a communication path between an individual client's communication device and the controller platform;

a processor responsive to microinstruction code for performing a BDDS compilation process by:
  receiving responses to the predetermined set of questions from the individual client via the client input interface;
  processing the responses to generate an RT value and a PT value for the individual client;
  comparing the RT value to the predetermined set of RT classifications to select an individualized RT classification for the individual client;
  comparing the PT value to the predetermined set of PT classifications to select an individualized PT classification for the individual client; and
  defining the respective individualized RT and PT classifications as a generated BDDS profile for the individual client, the generated BDDS profile defined as a modular, reusable BDDS profile available for use by the individual client in various future situations;

a third memory element for storing the generated, modular, reusable BDDS profile for the individual client;

a facilitator output interface to the third memory element for allowing third-party access to the modular, reusable BDDS profile generated by the electronic simulator visual display system, in communication with the third memory element, for use by the third-party in creating various, different goal-specific, third-party objectives, without requiring repetition of the BDDS compilation process;

a human machine interface (HMI) for accessing the third memory element and the modular, reusable BDDS profile, the HMI operable to generate image-based data associated with the modular, reusable BDDS profile; and a display device in communication with the HMI of the controller platform, the display device responsive to the image-based data for providing a visual realization of the individualized RT and PT classifications stored in the modular, reusable BDDS profile, the visual realization in the form of separate visual sectors, a first visual sector illustrating the predetermined set of RT classifications with the individualized RT classification presented in a visually-distinct manner with respect to the remaining set of RT classifications, and a second visual sector illustrating the predetermined set of PT classifications with the individualized PT classification presented in a visually-distinct manner with respect to the remaining set of PT classifications.

8. The electronic simulator visual display system as defined in claim 7 wherein the processor is further responsive to microcode instructions to:
  access the third memory element and retrieve the modular, reusable BDDS profile;
  receive, via the client input interface, a set of objective decision-making client data associated with client planning as defined by a third-party facilitator;
  weight the received set of objective decision-making client data by the client's individualized RT and PT classifications stored in the modular, reusable BDDS profile to create resultant output goals specific to the client planning purposes of the third-party facilitator; and
  present, on the display device, the received set of objective decision-making client data in a third visual sector, with the first, second, and third visual sectors configured to create a converging triangular visualization, with the resultant output goals displayed in a centralized area determined by performing a triangulation on data displayed in the first, second, and third visual sectors.

9. The electronic simulator visual display system as defined in claim 8 wherein the triangulation results shown in the centralized area of the display device is configured to include a balance indicator, displaying when weighting contributions from the first, second, and third visual sections meet an intended output goal, the visual display system configured to visualize said triangulation results outside of the balance indicator when said respective weighting contributions do not meet the intended output goal (out-of-balance).

10. The electronic simulator visual display system as defined in claim 9 wherein the triangular visualization of the respective first, second, and third visual sectors is displayed as a level bubble, and the balance indicator comprises a donut-like image, with the level bubble displayed within the donut-like image when the respective weighting contributions meet an intended output goal and the level bubble displayed outside the donut-like image when said weighting contributions are out-of-balance and do not meet an intended output goal.

11. The electronic simulator visual display system as defined in claim 9 wherein the processor is responsive to when said respective weighting contributions do not meet one or more of the intended output goals and initiates a corrective process including modifying one or more of the RT, PT and objective data classifications and performing an updated triangulation process until a balanced output, meeting said one or more intended output goals, is achieved.

12. The electronic simulator visual display system as defined in claim 7 wherein
  the first visual sector comprises a color wheel having shades of a first color, with the individualized RT classification exhibiting a first differentiating color with respect to the remaining classifications of the predetermined set of RT classifications;

the second visual sector comprises a color wheel having shades of a second color, with the selected, individualized PT classification exhibiting a second differentiating color with respect to the remaining classifications of the predetermined set of PT classifications and the third visual sector comprises a color wheel having shades of a third color, with each separate objective data classification exhibiting a different shade.

13. The electronic simulator tool as defined in claim 7 wherein the set of predetermined questions stored in the second memory element further comprises:

the subset of RT questions including questions concerning recollection of and reaction to: past emotional events, and/or abrupt investment market declines, and/or decisions to change lifestyle spending, and/or actual or potential loss of employment; and/or career setbacks, and/or illness of self or family members; and/or relationship changes, and/or births or deaths of family members, and/or life regrets, and/or vehicular operation; and the subset of PT questions including multiple choice questions concerning self-evaluation of personal character traits, and/or activity preferences, and/or learning methodology/subject matter preferences, and/or information evaluation preferences, and/or communication style preferences, and/or past coping in response to adverse outcomes.

14. A process for creating a reusable behavior-influenced decision-making data set (BDDS) of behavior-related risk temperament and preference typology characteristics of an individual client, including:

accessing a collection of data structures in computer readable memory, including a first memory element for storing a predetermined set of risk temperament (RT) classifications that are indicative of an individual human's behavioral mood, or attitude for perceiving and processing events with uncertain future outcomes while in an affectively aroused emotional state and a predetermined set of preference typology (PT) classifications that are indicative of an individual human's behavioral and psychological preferences for absorption of information, to help that individual in the future to evaluate and resolve uncertain outcome events;

a second memory element for storing a predetermined set of questions used in evaluating the individual client, the set of questions including a subset of RT questions and a subset of PT questions; the RT questions including open-ended questions concerning how the individual, while in an affectively aroused emotional state, historically has made and/or hypothetically would make behavioral decisions about events with uncertain outcomes; and the PT questions including a set of multiple choice questions to elicit how the individual absorbs information and takes action upon absorption of such information;

a third memory element for storing a generated behavior-influenced decision-making data set (BDDS) profile; and using a processor responsive to instructions stored as non-transitory program code for performing a BDDS compilation process by:

receiving responses to the predetermined set of questions from the individual client via a client input interface;

processing the responses to generate an RT value and a PT value for the individual client;

comparing the RT value to the predetermined set of RT classifications to select an individualized RT classification for the individual client;

comparing the PT value to the predetermined set of PT classifications to select an individualized PT classification for the individual client;

defining the respective individualized RT and PT classifications as a generated BDDS profile for the individual client, the generated BDDS profile defined as a modular, reusable BDDS profile available for use by the individual client in various future situations; and storing the generated, modular, reusable BDDS profile in the third memory element.

15. The process as defined in claim 14 wherein the process further comprises:

accessing the third memory element to retrieve a selected modular, reusable BDDS profile for use in individual client planning.

16. The process as defined in claim 14 wherein the set of predetermined questions stored in the second memory element further comprises:

the subset of RT questions including questions concerning recollection of and reaction to: past emotional events, and/or abrupt investment market declines, and/or decisions to change lifestyle spending, and/or actual or potential loss of employment; and/or career setbacks, and/or illness of self or family members; and/or relationship changes, and/or births or deaths of family members, and/or life regrets, and/or vehicular operation; and the subset of PT questions including multiple choice questions concerning self-evaluation of personal character traits, and/or activity preferences, and/or learning methodology/subject matter preferences, and/or information evaluation preferences, and/or communication style preferences, and/or past coping in response to adverse outcomes.

17. A process for creating a set of resultant output goals from a combination of a reusable behavior-influenced decision-making data set (BDDS) of behavior-related risk temperament and preference typology characteristics of an individual client and an objective decision-making data associated with at least one specific goal of an individual client, the process including:

accessing a collection of data structures in computer readable memory, including a first memory element for storing a predetermined set of risk temperament (RT) classifications that are indicative of an individual human's behavioral mood, or attitude for perceiving and processing events with uncertain future outcomes while in an affectively aroused emotional state and a predetermined set of preference typology (PT) classifications that are indicative of an individual human's behavioral and psychological preferences for absorption of information, to help that individual in the future to evaluate and resolve uncertain outcome events;

a second memory element for storing a predetermined set of questions used in evaluating the individual client, the set of questions including a subset of RT questions and a subset of PT questions; the RT questions including open-ended questions concerning how the individual, while in an affectively aroused emotional state, historically has made and/or hypothetically would make behavioral decisions about events with uncertain outcomes; and the PT questions including a set of multiple choice questions to elicit how the individual absorbs information and takes action upon absorption of such information;

a third memory element for storing a generated behavior-influenced decision-making data set (BDDS) profile as a modular, reusable BDDS profile for the individual client;

collecting an objective decision-making client data set from the individual client; and using a processor responsive to instructions stored as non-transitory program code for performing a BDDS compilation process by:

receiving responses to the predetermined set of questions from the individual client via a client input interface;

processing the responses to generate an RT value and a PT value for the individual client;

comparing the RT value to the predetermined set of RT classifications to select an individualized RT classification for the individual client;

comparing the PT value to the predetermined set of PT classifications to select an individualized PT classification for the individual client; and defining the respective individualized RT and PT classifications as a generated BDDS profile for the individual client, the generated BDDS profile defined as a modular, reusable BDDS profile available for use by the individual client in various future situations;

storing the generated BDDS profile for the individual client in the third memory element as the modular, reusable BDDS profile for the individual client; and weighting the collected decision-making objective data set by the respective individualized RT and PT classifications to generate an output goal data set (OGDS) for use by the individual client.

18. The process as defined in claim 17 wherein the objective decision-making client data set collected from the individual client is associated with a plurality of separate individual goals and the collecting step of the process collects a plurality of different sets of decision-making objective data, wherein in performing the weighting step of the process the following steps are performed:

weighting each separate decision-making objective data set with the respective individualized RT and PT classifications; and generating a separate output goal data set of each individual goal.

19. The process as defined in claim 18 wherein a group of three different output goal data sets are created for the individual client, with the results of the group triangulated and combined to create an integrated client planning tool based upon a combination of the plurality of individual goals.

20. The process as defined in claim 18 wherein groups of three different output goal data sets are created in a hierarchical form, wherein any modifications to the respective individualized RT and PT classifications at any level of the hierarchical form are applied to the other levels in a recursive manner until a new balanced condition is achieved, in which the respective weighting contributions in each respective level meet an intended output goal.

* * * * *